US006814830B2

(12) United States Patent
Yokozawa et al.

(10) Patent No.: US 6,814,830 B2
(45) Date of Patent: Nov. 9, 2004

(54) HOT-STAMPING FOIL TAPE CASSETTE AND FOIL-PEELING MECHANISM FOR HOT-STAMPING DEVICE AND PEELING METHOD FOR HOT-STAMPING FOIL A CONTROL METHOD FOR HOT-STAMPING FOIL TAPE CASSETTE

(75) Inventors: Mitsuo Yokozawa, Nagano (JP); Kiyotsugu Takasawa, Nagano (JP); Yukio Kuroiwa, Nagano (JP); Fumito Komatsu, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 203 days.

(21) Appl. No.: 10/042,033

(22) Filed: Oct. 25, 2001

(65) Prior Publication Data

US 2002/0096063 A1 Jul. 25, 2002

(30) Foreign Application Priority Data

Oct. 26, 2000 (JP) ....................................... 2000-326632
Oct. 31, 2000 (JP) ....................................... 2000-333669

(51) Int. Cl.[7] ............................ B44C 1/17; B32B 3/20; G01D 15/16; B41J 32/00

(52) U.S. Cl. ....................... 156/230; 156/238; 156/247; 156/344; 156/540; 156/543; 156/584; 347/214; 400/207; 400/247

(58) Field of Search ................................ 156/230, 233, 156/238, 240, 247, 277, 288, 540, 543, 581, 583.1; 427/146, 147, 148; 347/193, 214; 400/247, 207; 206/459.1

(56) References Cited

U.S. PATENT DOCUMENTS

| | | | | | |
|---|---|---|---|---|---|
| 4,930,911 | A | * | 6/1990 | Sampson et al. | 400/28 |
| 5,035,325 | A | * | 7/1991 | Kitsuki | 206/459.5 |
| 5,087,137 | A | * | 2/1992 | Burnard et al. | 400/249 |
| 5,719,616 | A | * | 2/1998 | Danjo et al. | 347/214 |

FOREIGN PATENT DOCUMENTS

| | | |
|---|---|---|
| EP | 1201427 A2 | 5/2002 |
| JP | 7-304157 | 11/1995 |

* cited by examiner

*Primary Examiner*—J. A. Lorengo
(74) *Attorney, Agent, or Firm*—Reed Smith LLP

(57) ABSTRACT

A hot-stamping foil tape cassette comprises a hot-stamping foil tape transferred by pressure application together with a value-added medium to the value-added medium and a windup reel for winding up the hot-stamping foil tape. The reel on which the hot-stamping foil tape is wound is stored in a cassette case. A shutter is included which at the time of hot-stamping transfer is in a protective position that protects the hot-stamping foil tape. The shutter at the time of hot-stamping transfer withdraws to a withdrawal position that does not interfere with action of the hot-stamping transfer. After hot-stamping, by the shutter, the hot-stamping foil tape can be peeled from the value-added medium. A foil-peeling mechanism for a hot-stamping device, a peeling method for a hot-stamping foil and a control method for a hot-stamping foil tape cassette are also disclosed.

9 Claims, 27 Drawing Sheets

HOT-STAMPING FOIL TAPE CASSETTE AND FOIL-PEELING MECHANISM FOR HOT-STAMPING DEVICE AND PEELING METHOD FOR HOT-STAMPING FOIL A CONTROL METHOD FOR HOT-STAMPING FOIL TAPE CASSETTE

CROSS-REFERENCE TO RELATED APPLICATIONS

This application claims priority of Japanese Application No. 2000-326632, filed Oct. 26, 2000 and Japanese Application No. 2000-333669, filed Oct. 31, 2000 the complete disclosures of which are hereby incorporated by reference.

BACKGROUND OF THE INVENTION a) Field of the Invention

This invention relates to a hot-stamping foil tape cassette for peeling a hot-stamping foil tape from a value-added medium after hot-stamping transfer to the value-added medium, and a foil-peeling mechanism in a hot-stamping device and a peeling method for the hot-stamping foil.

Further, this invention relates to a hot-stamping foil tape cassette to enable simple and, moreover, appropriate control of a hot-stamping foil such as a holographic foil and the like, and a control method for a hot-stamping foil tape cassette.

b) Description of the Related Art

In a hot-stamping process to transfer holographic foil to a value-added medium, especially to official documents and the like that have special added value as a value-added medium, in order to fuse holographic foil (a vapor-deposited layer such as aluminum, etc.) to the medium after hot-stamping, a carrier film supporting vapor deposited layer is also fused to the medium. In a conventional hot-stamping device, this carrier film is peeled from the medium according to the following methods to complete the hot-stamping process.

In a first method, a carrier film is pulled up to create a greater than specified peeling angle between the carrier film and medium, the carrier film is peeled. Further, in a second method, the carrier film is rolled up to create greater than a specified peeling angle between the carrier film and medium, the carrier film is peeled during this time by a conveying medium as well. Further, in a third method, as disclosed in Japanese Unexamined Patent (Kokai) Hei 7-304157, a lever part is inserted between the medium and the carrier film, the carrier film is peeled from the medium by moving a lever part in a region of fusion.

Further, heretofore, a hot-stamping foil, for example, holographic foil, was added by means of hot-stamping device to a value-added medium such as a ticket, a document, a credit card, with the intention of preventing forgery of a value-added medium and proffering brand protection.

Holographic foil may have original designs and patterns created according to individual requests from each customer. Further, a usage fee (a royalty) for holographic foil is usually proportional to the number of sheets of holographic foil used. For example, when a sales group hands over holographic foil tape containing holographic foil for a fixed number of sheets to the customer, compensation commensurate with this fixed number of sheets is received from this customer.

Further, because holographic foil is important as a proof of the medium being of value, it is necessary to protect holographic foil itself from wrongdoing such as theft and forgery, by implementing control, for example, by a designated controller for storage under stringent conditions in a designated location.

Nonetheless, in a method for peeling carrier film from a medium in a conventional hot-stamping device, the following problems occur, especially when a medium that is a hot-stamping object comprises documents such as brochures.

First, in the first method, there are situations where documents are pulled up together with film when a carrier film is pulled up, so that problems occur such as unsatisfactory peeling and damage to documents. For this reason, application of this method is limited to a group of documents where there are no problems when tension is imparted, usually continuous-feed paper.

Further, in the second method, there are situations where one part of a document, such as a cover sheet only, is conveyed, problems occur such as unsatisfactory peeling and damage to documents. Furthermore, there is no need to construct a drive section for conveying documents; this, however, is linked to an increase in the cost of a hot-stamping device.

Further, in the third method, because there is a need to move a lever part throughout the region of fusion, there is a need to ensure space so that there is no interference in the range of movement. Accordingly, a problem is presented of scaling up the entire hot-stamping device, which is linked to an increase in the cost of the hot-stamping device.

Furthermore, in a conventional hot-stamping device where said first to third methods are applicable, a holographic foil is installed as an open reel system, and space for realizing said first to third methods can be ensured, but there is the problem of scaling up the entire device. Further, in a hot-stamping device with structure having such arrangement, because there is need to set holographic foil by, as it were, stitching the various structural parts together, there is the problem that exchange of holographic foil can only be done by skilled persons or professional service providers.

Furthermore, the following problems occur in the control of conventional hot-stamping foil, for example, holographic foil.

First, the control of sheet usage count for holographic foil is not accurate. Holographic foil tape does not necessarily contain a fixed number of holographic foil, actually, in many cases, sheet count is greater than the number of sheets proffered, and extras are provided. For this reason, it is not possible to recover an appropriate royalty corresponding to the number of sheets issued of the value-added medium, in other words, sheet usage count of holographic foil. Further, in the case of holographic foil of continuous design where there are no identification marks to determine location, because of a variation in the roll-up spacing of holographic foil, the number of stampable sheets from a roll of tape varies to the end; this is unfair and inequitable.

Second, as a countermeasure to wrongdoing such as theft and forgery of the holographic foil itself, it is dependent in many cases on the controller of the holographic oil or the user of hot-stamping device. This requires expenditure of manpower and, further, it is difficult to constantly maintain control quality under actual conditions.

Third, when special holographic foil is used, created according to individual request from the customer, there is a need every time the holographic foil is exchanged, to change the setup of the hot-stamping device to optimal stamping conditions (for example, optimal temperature, optimal pressure application, optimal time, etc.), according to the kind of holographic foil or according to directions from the manufacturer of holographic foil; this is complicated.

OBJECTS AND SUMMARY OF THE INVENTION

Therefore, this invention has as a primary object providing hot-stamping foil tape cassette that enables satisfactory peeling of hot-stamping foil with no damage to the value-added medium and, moreover, provides easy exchange operations for holographic foil and the foil-peeling mechanism in a hot-stamping device and a peeling method for a hot-stamping foil.

Further, this invention has as a further object, providing a hot-stamping foil tape cassette and a control method for hot-stamping foil tape cassette wherein control of the hot-stamping foil can be performed simply and, moreover, appropriately, such as control of sheet count of hot-stamping foil, prevention of wrongdoing such as forgery to hot-stamping foil, and determination of optimal stamping conditions according to hot-stamping foil.

In order to achieve such objects in accordance with the invention, in a hot-stamping foil tape cassette, a hot-stamping foil tape is transferred by pressure application together with a value-added medium to the value-added medium, and a windup reel for winding up a hot-stamping foil tape, and a reel on which hot-stamping foil tape is wound, is stored therein. The cassette case has a shutter that, except at the time of hot-stamping transfer, is in a protective position that protects hot-stamping foil tape. On the other hand, at the time of hot-stamping transfer the shutter withdraws to a withdrawal position that does not interfere with action of said hot-stamping transfer. After hot-stamping, by means of the shutter, hot-stamping foil tape can be peeled from the value-added medium.

Therefore, except at the time of hot-stamping transfer, the hot-stamping foil is protected by a shutter from physical damage such as dirt, heat, cuts and scratches, etc. On the other hand, when the shutter is opened at the time of hot-stamping and the shutter is closed again after hot-stamping, the shutter is inserted between the hot-stamping foil tape and the value-added medium to enable peeling of hot-stamping foil tape from the value-added medium.

Further, in accordance with the invention, a foil-peeling mechanism of a hot-stamping device is provided with a hot-stamping foil tape cassette as described above, and a cassette movement mechanism that makes a hot-stamping foil tape cassette come in contact with a value-added medium at the time of hot-stamping and together with this, after hot-stamping, withdraws the hot-stamping foil tape cassette from the value-added medium, at the time of hot-stamping, the shutter in the hot-stamping foil tape cassette opens; on the other hand, after hot-stamping, the shutter is closed in conjunction with withdrawal of a hot-stamping foil tape cassette from the value-added medium to peel the hot-stamping foil tape from the value-added medium.

Consequently, as the hot-stamping foil tape cassette is being withdrawn from the value-added medium to pull up the hot-stamping foil tape from the value-added medium, the shutter is being inserted between the hot-stamping foil tape and the value-added medium. In this mode, the hot-stamping foil tape can be peeled from the value-added medium consistently and, moreover, in satisfactory fashion.

Further, in accordance with the invention, in a foil-peeling mechanism in a hot-stamping device, the cassette movement mechanism has a connection part connecting to the shutter, the shutter is opened and closed by action of cassette movement mechanism. Consequently, cassette action of withdrawing from the value-added medium and closing the shutter can be linked so that as the hot-stamping foil tape is being pulled up from the value-added medium, the shutter is being inserted between the hot-stamping foil tape and the value-added medium.

Further, in a peeling method for the hot-stamping foil described in accordance with the invention, the hot-stamping foil tape cassette described above is used; at the time of hot-stamping, the hot-stamping foil tape cassette is made to come in contact with the value-added medium and, moreover, the shutter in the hot-stamping foil tape cassette is opened, after hot-stamping, as the hot-stamping foil tape cassette is being withdrawn from the value-added medium, the shutter is closed to peel hot-stamping foil tape from the value-added medium.

Therefore, except at the time of hot-stamping transfer, the hot-stamping foil is protected by the shutter from physical damage such as dirt, heat, cuts and scratches, etc. On the other hand, when the shutter is opened at the time of hot-stamping and the shutter is closed again after hot-stamping, as the hot-stamping foil tape is being pulled up from the value-added medium, the shutter is inserted between the hot-stamping foil tape and the value-added medium; in this mode, the hot-stamping foil tape can be peeled from the value-added medium consistently and, moreover, in satisfactory fashion.

In order to achieve such objectives, in accordance with the invention, in a hot-stamping foil tape cassette that has stored in a cassette case, a hot-stamping foil tape transferred by pressure application together with the value-added medium to the value-added medium, is provided with a non-contacting tag that records control information.

Consequently, by confirming the presence of a non-contacting tag and its validity, use of a fraudulent hot-stamping foil tape cassette that does not have a non-contacting tag or has an unqualified non-contacting tag can be eliminated. Further, information relevant to control of sheet count of a hot-stamping foil and optimal stamping conditions corresponding to a hot-stamping foil, etc. can be recorded on a non-contacting tag. By utilizing this control information, control of sheet count of the hot-stamping foil and control of a setup of optimal stamping conditions corresponding to a hot-stamping foil, etc. can be performed simply and, moreover, appropriately, without depending on human input.

Further, in a control method for hot-stamping foil tape cassette in accordance with the invention, a non-contacting tag that records control information is provided in a hot-stamping foil tape cassette that has stored therein a hot-stamping foil tape that is transferred by a pressure application together with a value-added medium to said value-added medium; a hot-stamping device where hot-stamping foil tape cassette is set is provided with communication function for communicating with non-contacting tag so that the hot-stamping device can identify the hot-stamping foil tape cassette on the basis of control information.

Consequently, when the hot-stamping device provided with a communication function communicates with a non-contacting tag, the presence and validity of the non-contacting tag is confirmed and use of a hot-stamping device by a fraudulent hot-stamping foil tape cassette that does not have the non-contacting tag or has a unqualified non-contacting tag can be prevented. Further, the hot-stamping device can identify a hot-stamping foil tape cassette that was set, on the basis of control information recorded on the non-contacting tag, and can effect precise processing, according to the kind and status of this cassette.

Further, in accordance with the invention, in a control method for a hot-stamping foil tape cassette described above, control information is included by an approved number of a stamping cycle, refreshed by subtracting "1" each time hot-stamping is implemented; when an approved stamping cycle number is "0", the hot-stamping device does not implement hot-stamping.

Consequently, when the approved stamping cycle number becomes "0", stamping is not implemented when the predetermined number of stamping cycle is exceeded, and even if there is a leftover hot-stamping foil tape, precise control of sheet usage count of hot-stamping foil is implemented.

Further, in accordance with the invention, in a control method for the hot-stamping foil tape cassette described above, control information is included on the stamping condition information, so that hot-stamping device implements hot-stamping according to stamping condition information.

Consequently, even when optimal stamping conditions vary with the kind of hot-stamping foil tape, etc., the hot-stamping device provides optimal control on the basis of the stamping condition information, so there is no need for the user to do reset, stamping can be performed under optimal conditions on a hot-stamping foil tape in general use.

Still further, in accordance with the invention, a control method for a hot-stamping foil tape cassette a tape ID code in control information is included and a hot-stamping device has a recording medium for registering a tape ID code of a processible hot-stamping foil tape as an approved ID code. In this method, hot-stamping is not implemented when the tape ID code is not included in the approved ID code. Therefore, customized hot-stamping foil tape for a special customer can be used only by a special customer that has a hot-stamping device in which this hot-stamping foil tape ID code is registered, therefore, security of a customized hot-stamping foil can be increased.

In a further aspect of the invention, in a control method for a hot-stamping foil tape cassette described above, a user code and password are registered in a recording medium, and hot stamping can be implemented after the user code and password are confirmed. Consequently, fraudulent hot-stamping usage by non-authorized persons can be prevented.

Finally, in accordance with the invention, in a control method for a hot-stamping foil tape cassette described above, the recording medium is a second non-contacting tag that is able to communicate with a communication function of the hot-stamping device. Consequently, if a second non-contacting tag is moved to another hot-stamping device, this device can be utilized under identical conditions without repeating the setup. Further, the communication function of the hot-stamping device is shared with a non-contacting tag provided on hot-stamping tape cassette and the second non-contacting tag.

DESCRIPTION OF THE PREFERRED EMBODIMENTS

Figure 1:
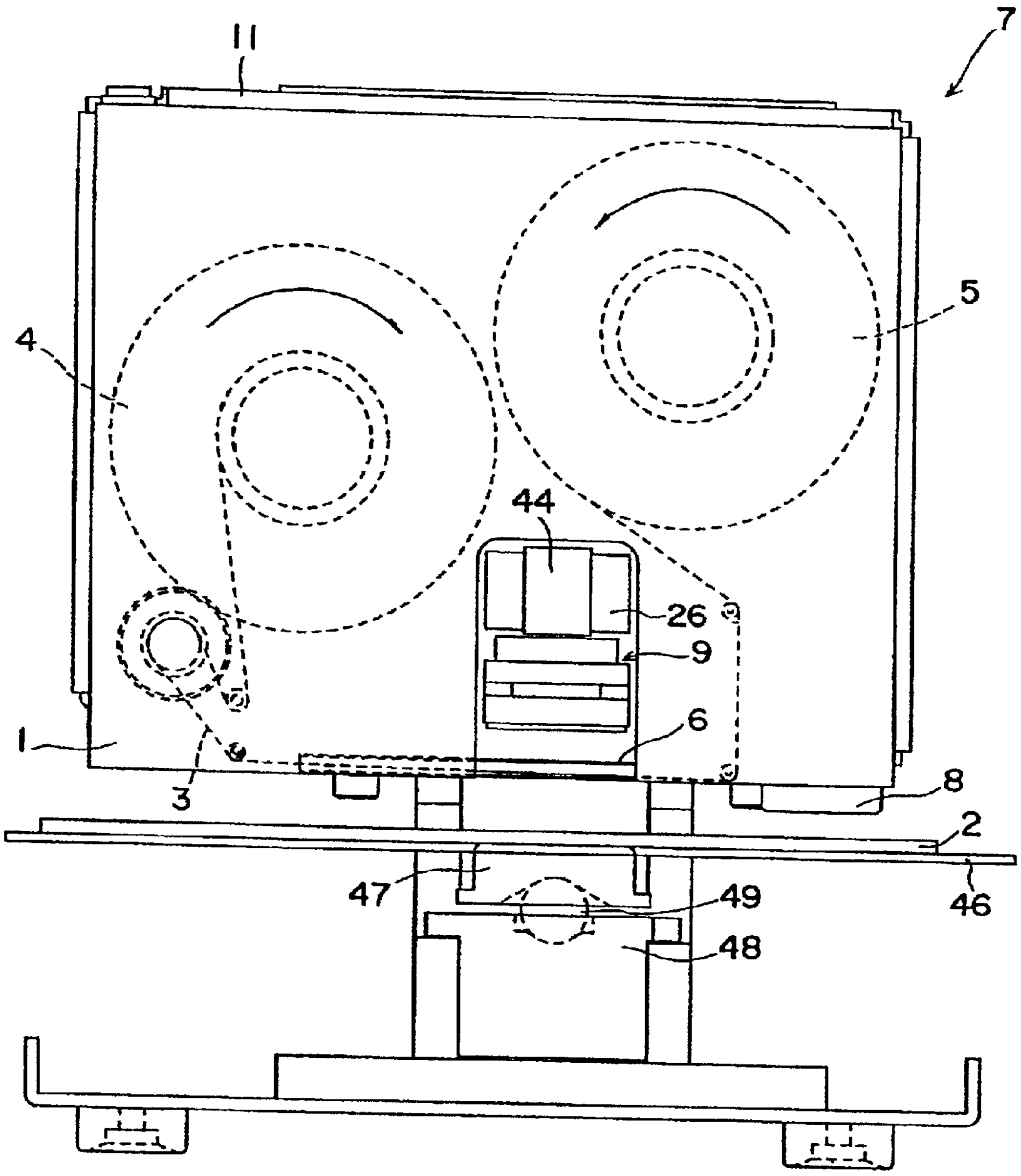
FIG. 1 shows one embodiment of hot-stamping device, utilizing peeling mechanism of a hot-stamping foil tape cassette and a hot-stamping device of this invention, and a simplified front view showing hot-stamping device in a readiness state.

The embodiments of the invention are described below with reference to the drawings.

A hot-stamping foil tape cassette of the invention is shown in FIG. 1 to FIG. 16. In this hot-stamping foil tape cassette 1, a hot-stamping foil tape 3 transferred by pressure application together with value-added medium 2 to value-added medium 2, and windup reel 4 to wind up hot-stamping foil tape 3, and reel 5 on which hot-stamping foil tape 3 is wound, are stored in a cassette case; there is a shutter 6 that except at the time of hot-stamping transfer, is in a protective position that protects hot-stamping foil tape 3, and, on the other hand, at the time of hot-stamping transfer, withdraws to a withdrawal position that does not interfere with action of said hot-stamping transfer. After hot-stamping, by means of shutter 6, hot-stamping foil tape can be peeled from a value-added medium.

Value-added medium 2 comprising a hot-stamping object is a medium having value as protection from wrongdoing such as forgery or as a medium guaranteeing or certifying a fixed value by affixing a hot-stamping foil; there are no limitations in particular on the kind or form of medium. As such value-added medium 2, there are, for example, negotiable instruments such as tickets, gift certificates, cards such as credit cards and the like, documents such as certificates, confidential documents, official documents and the like. In this embodiment, as value-added medium 2, explanation is made with examples where documents are hot-stamping objects, in other words, documents from single sheets to brochures, having thickness and width. Below, in this embodiment, a value-added medium will be termed document 2.

Cassette 1 can be attached to or detached from hot-stamping device 7. By having hot-stamping foil tape 3 in the form of a cassette, it is, for example, easy to effect changeover to a hot-stamping foil tape 3 with a different pattern by exchanging cassette 1. Further, because hot-stamping foil tape 3 is stored in cassette 1, hot-stamping foil tape 3 cannot be removed by itself, misuse of tape 3 can be prevented. Hot-stamping foil is, for example, a holographic foil with a vapor-deposited layer of aluminum and the like. Hot-stamping foil tape 3 is constructed by supporting holographic foil on carrier film comprising transparent film.

Further, on the bottom face of cassette 1 in this embodiment, damper 8 is provided, for example, that can move with a load sufficient to hold document 2 in place. Clamper 8 protrudes from the bottom face of cassette 1, for example, when the bottom face of cassette 1 comes in contact with document 2, it is inserted in cassette 1. For example, in this embodiment, the stroke movement possible for damper 8 is set to be 5 mm. Consequently, when the bottom face of cassette 1 is at a position within 5 mm of document 2, damper 8 moves first and exerts force on document 2 to hold it in place.

Figure 5:
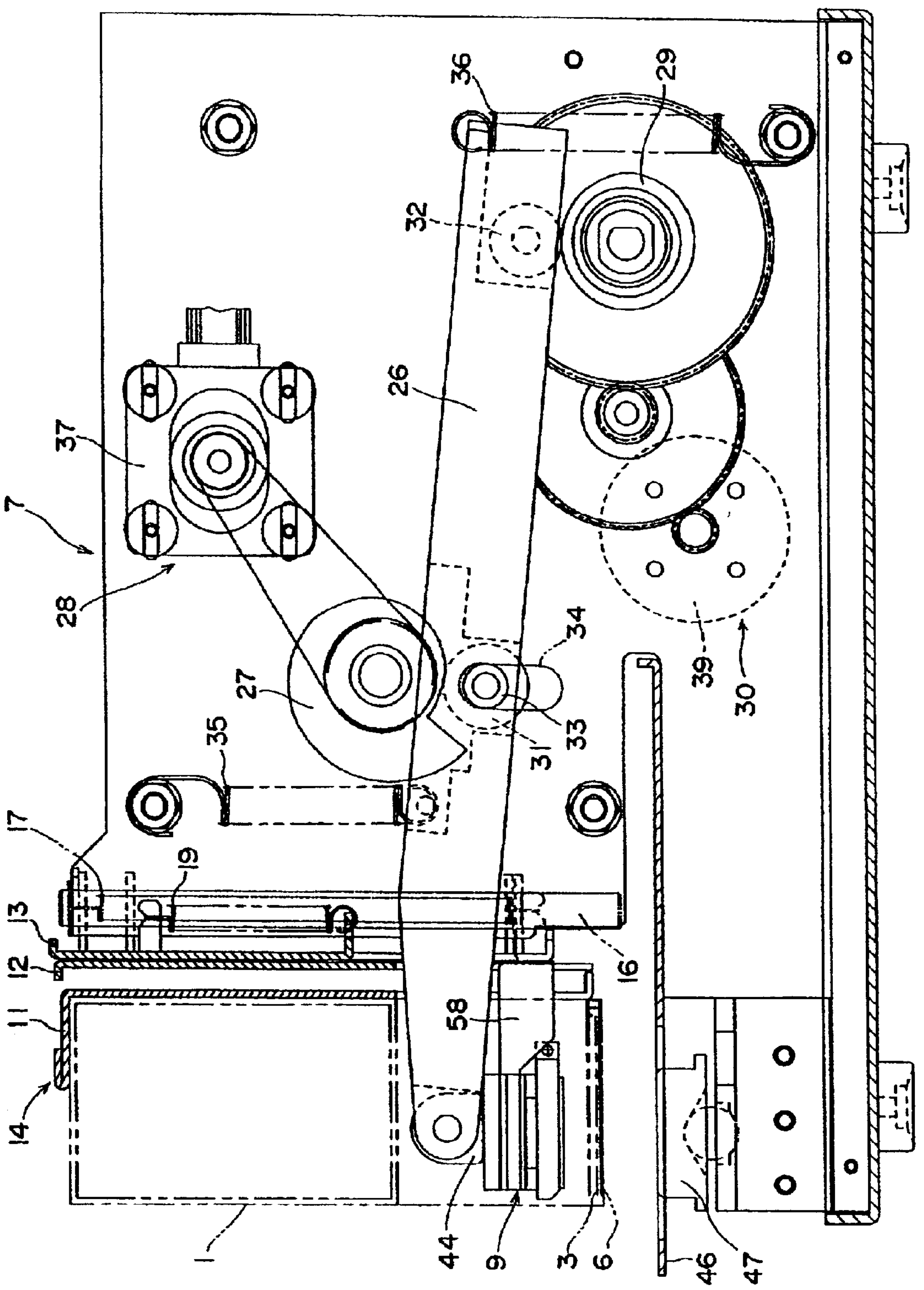
FIG. 5 is a simplified cross-sectional view from the side of hot-stamping device, showing the state when insertion block from state in FIG. 4 comes in contact with stamping section in said hot-stamping device.
Figure 6:
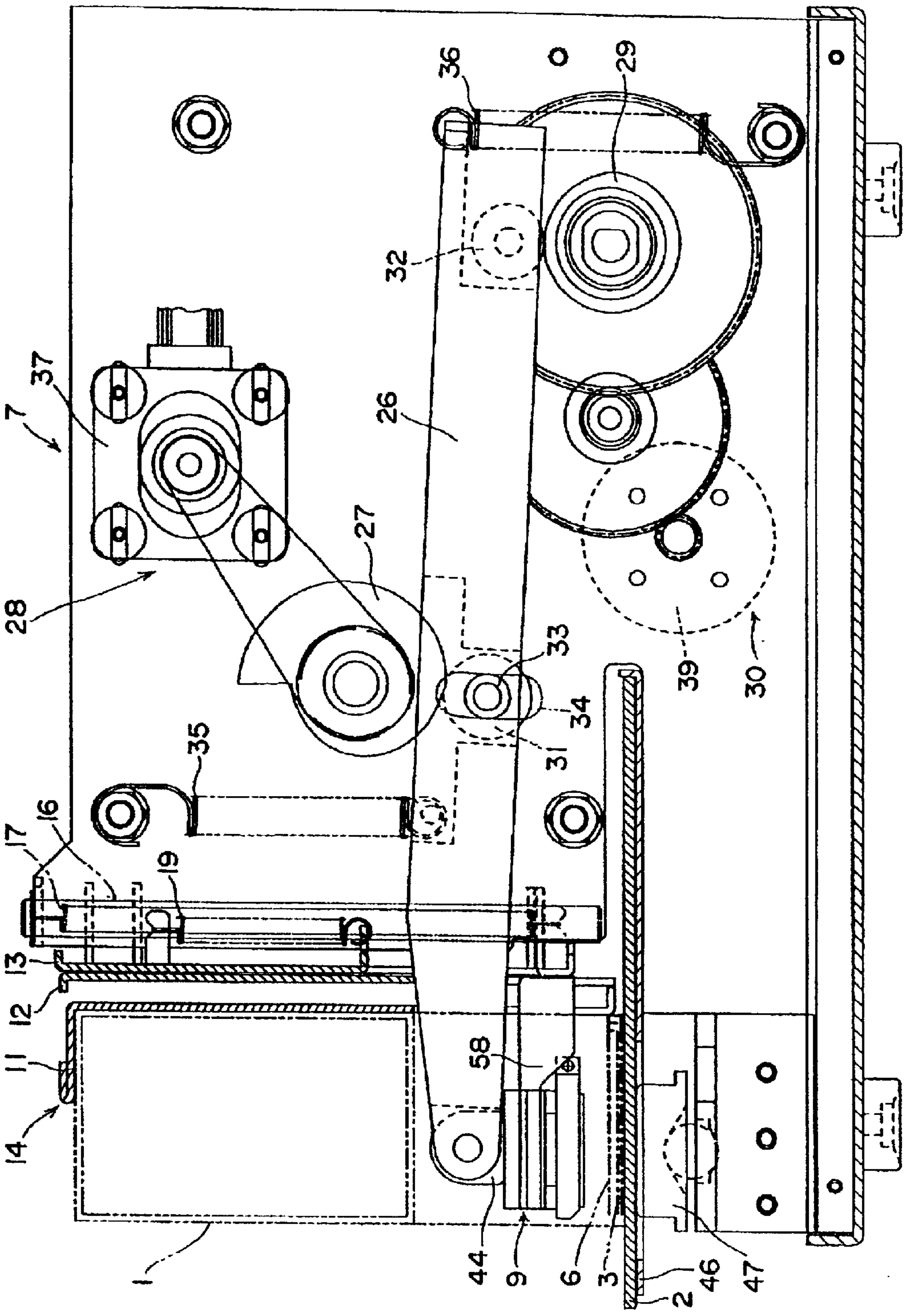
FIG. 6 is a simplified cross-sectional view from the side of hot-stamping device, showing the state when hot-stamping foil tape cassette from state in FIG. 5 comes in contact with the value-added medium in said hot-stamping device.

In hot-stamping device 7, tape-windup mechanism not shown in the figure is provided, windup reel 4 is driven in the direction of the arrow in FIG. 5. When windup reel 4 is driven, the used part of hot-stamping foil tape 3 is wound, and the unused part is sent out to the face opposite to stamping section 9 in hot-stamping device 7. Further, although it is not shown in the figure, on the side of send out reel 5, for example, a torque limiter is provided so hot-stamping foil 3 is not supplied unless tension exceeding braking force of the torque limiter is applied. On the other hand, on the side of windup reel 4, rotation of windup reel 4 is prevented through a reduction gear, for example, by maintenance torque (detente torque) on a motor operating windup drive. By means of such construction, it is possible to prevent stretching and loosing of hot-stamping foil tape 3 at the time of peeling hot-stamping foil tape 3 after hot-stamping.

Figure 16:
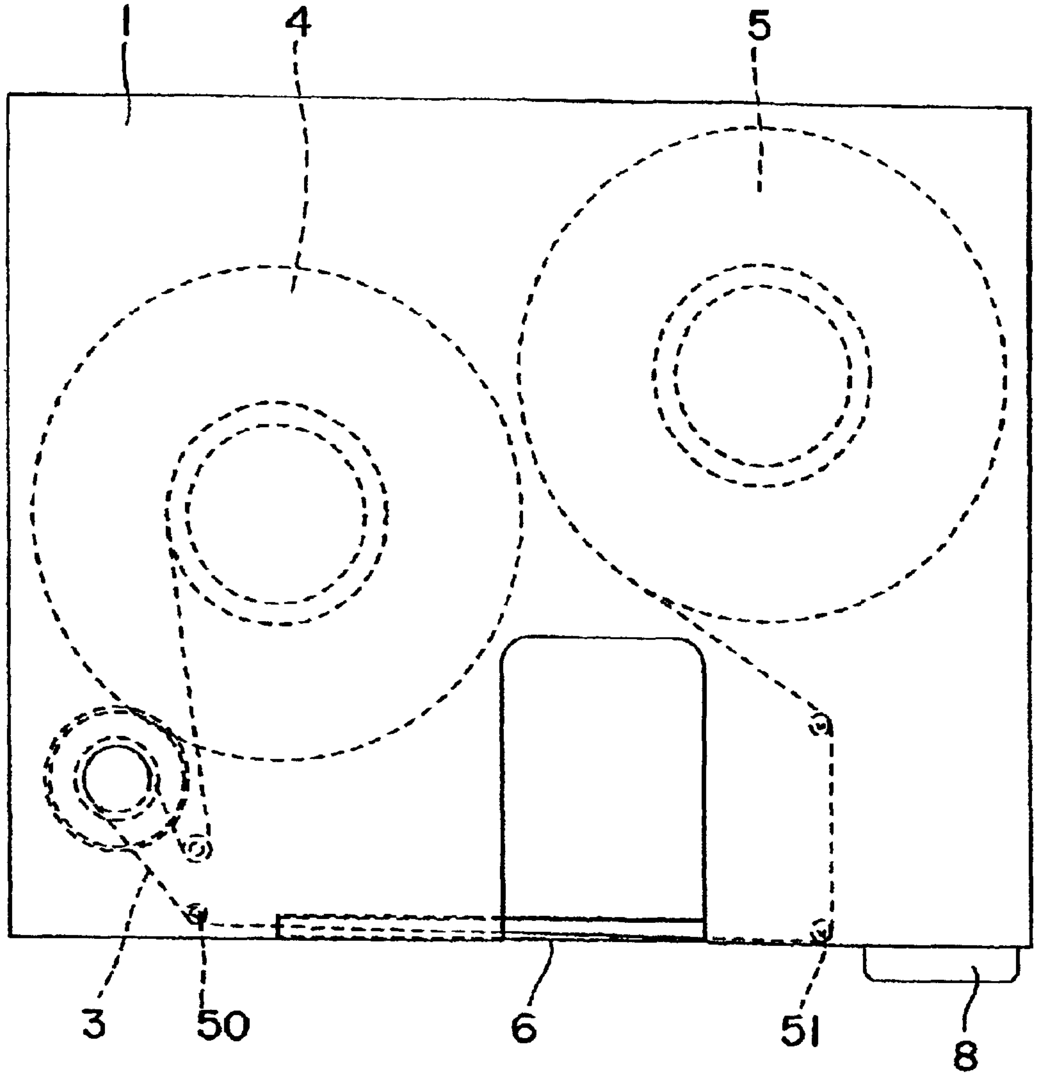
FIG. 16 is a simplified front view showing one example of hot-stamping foil tape cassette utilizing this invention.
Figure 17:
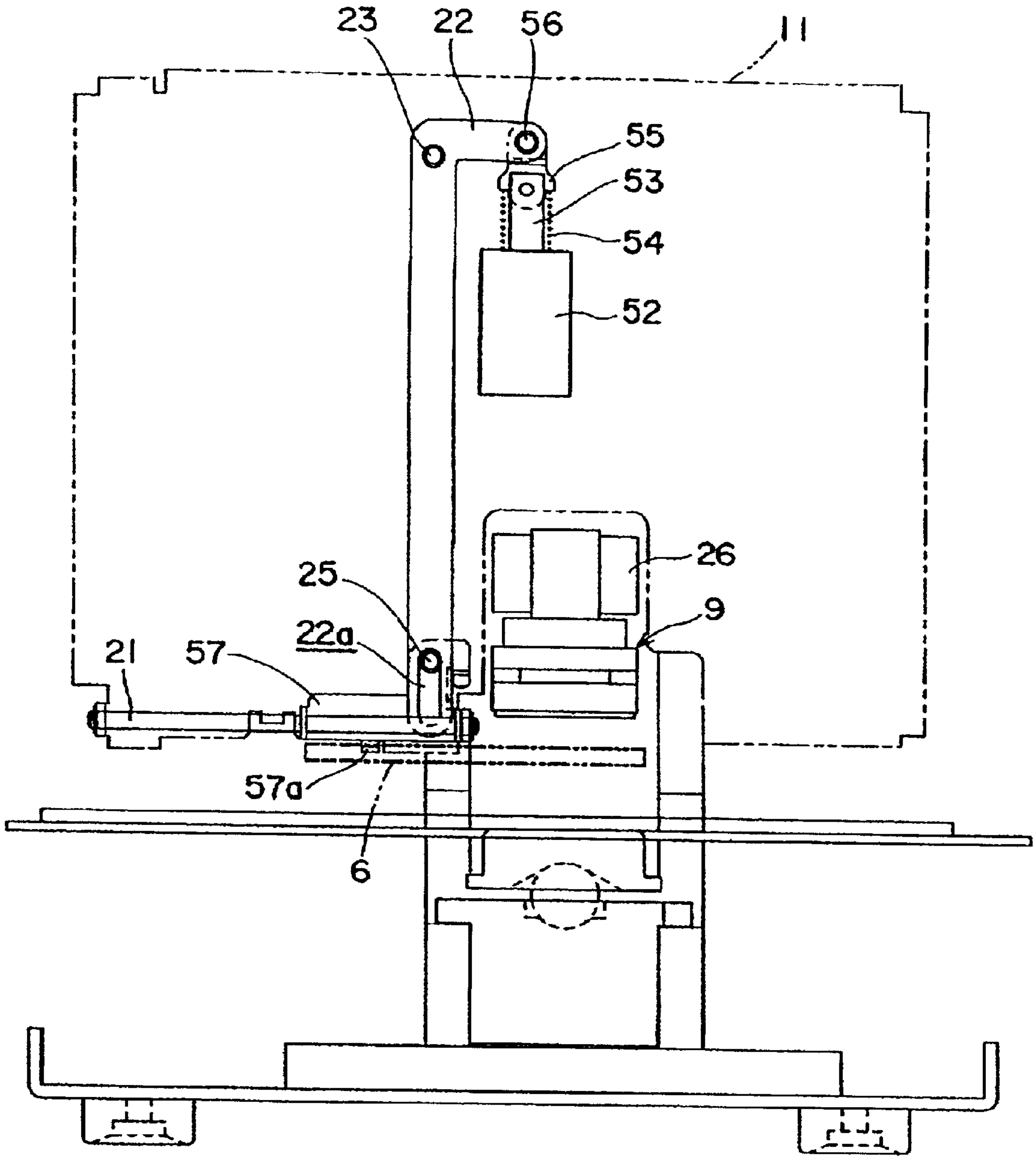
FIG. 17 is another embodiment of foil-peeling mechanism of this invention, showing an example provided with actuator for opening and closing shutter, and a simplified front view showing hot-stamping device in a readiness state.

Shutter 6, for example, is built into the bottom face of cassette 1 so that sliding motion is possible. Shutter 6 is formed in the shape of sideways “U”, for example, to protect from both front and back faces, the part of hot-stamping foil tape 3 that is exposed from the cassette case. When cassette 1 is mounted on hot-stamping device 7, shutter 6 is positioned on the face opposite stamping section 9. Opening and closing of shutter 6 is linked to hot-stamping action in hot-stamping device 7. In other words, at the time of hot-stamping transfer, shutter 6 is withdrawn from the face opposite stamping section 9 to expose hot-stamping foil tape 3 on the face opposite stamping section 9. Then, upon completion of hot-stamping, shutter 6 returns to an initial position to resume protection of hot-stamping foil tape 3; at this time of return, hot-stamping foil tape 3 is peeled from document 2 by means of shutter 6. Moreover, in this embodiment, as shown in FIG. 16, for example, guide roller 50 on the withdrawal side of shutter 6 is positioned by means of guide roller 51 to be somewhat above document 2 in the figure, hot-stamping foil tape 3 is positioned at an angle to document 2 so peeling of carrier film by shutter 6 can be effected in satisfactory fashion.

For example, hot-stamping device 7 is equipped with a cassette-movement mechanism 14 that makes cassette 1 come in contact with document 2 at the time of hot-stamping with a load such that there is no shifting of this document 2, and in conjunction with this, withdraws cassette 1 from document 2 after hot-stamping. By means of cassette 1 provided with shutter 6 and cassette movement mechanism 14, cassette 1 is made to come in contact with document 2 at the time of hot-stamping; moreover shutter 6 opens, after hot-stamping, the shutter is closed as cassette 1 is withdrawn from document 2 to peel hot-stamping foil tape 3 from document 2 by means of foil-peeling mechanism 15 in the structure. Furthermore, in this embodiment, cassette movement mechanism 14 is provided with connection part 57 that connects with shutter 6, shutter 6 is opened and closed by action of cassette movement mechanism 14.

One example of construction of hot-stamping device 7 provided with such foil-peeling mechanism 15 is described below.

Frame 10, 10 in hot-stamping device 7 is provided with guide shaft 16, 16 in the vertical direction. In this embodiment, cassette-movement mechanism 14 is constructed as follows to enable movement of cassette 1 in the shaft direction for guide shaft 16 through plate 11, 12, 13.

Figure 8:
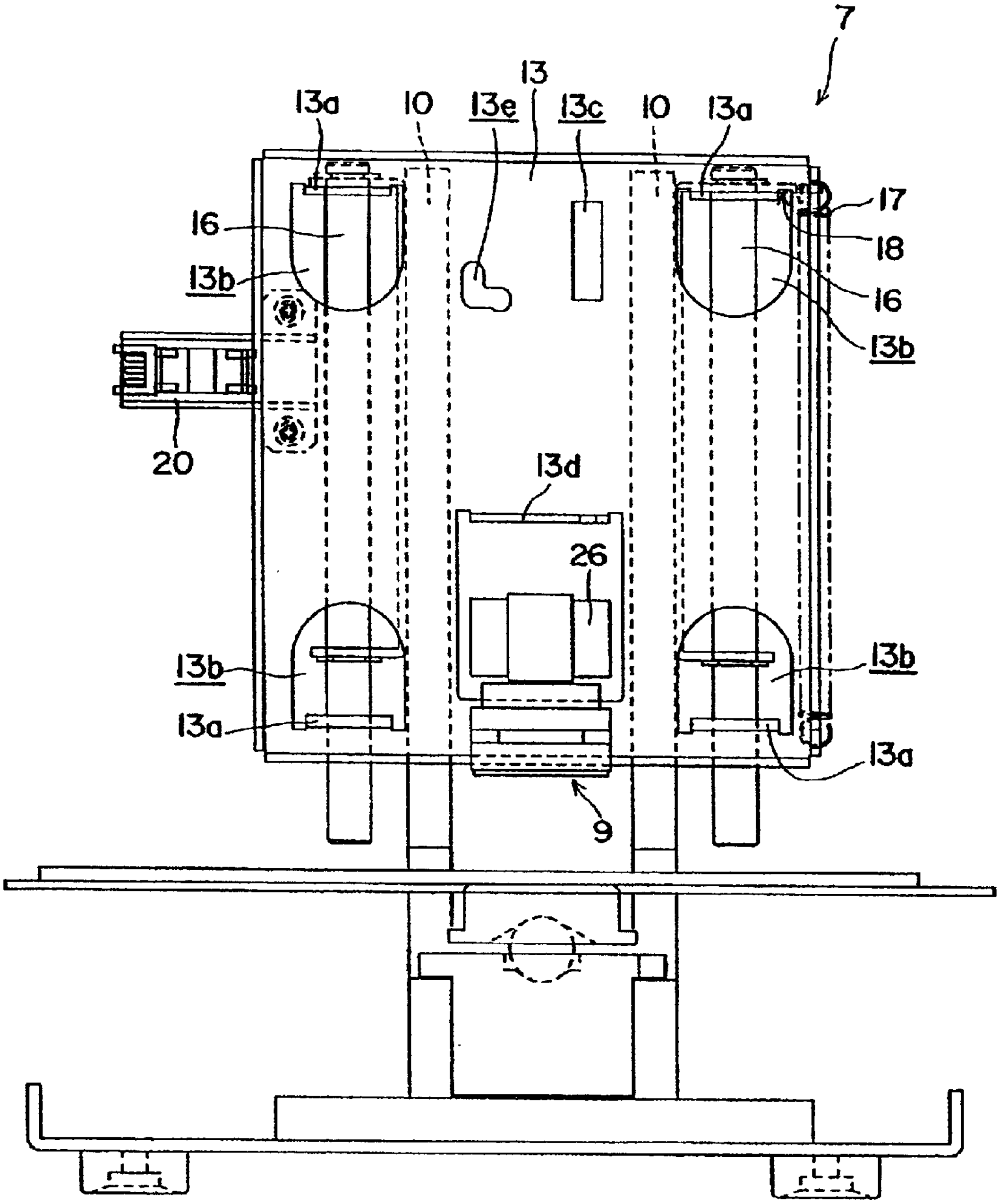
FIG. 8 is a figure explaining one example of construction of cassette movement mechanism, and a simplified front view of hot-stamping device, showing a mode of attachment of innermost plate.

Plate 13 is provided with flexing section **13*a* attached to guide shaft 16 so flexure is possible, attachment to guide shaft 16 is such that movement is possible (see FIG. 8). Further, plate 13, for example, by means of torsion coil spring 17 that exerts force, comes in contact with stopper 18 provided on frame 10**.

Figure 9:
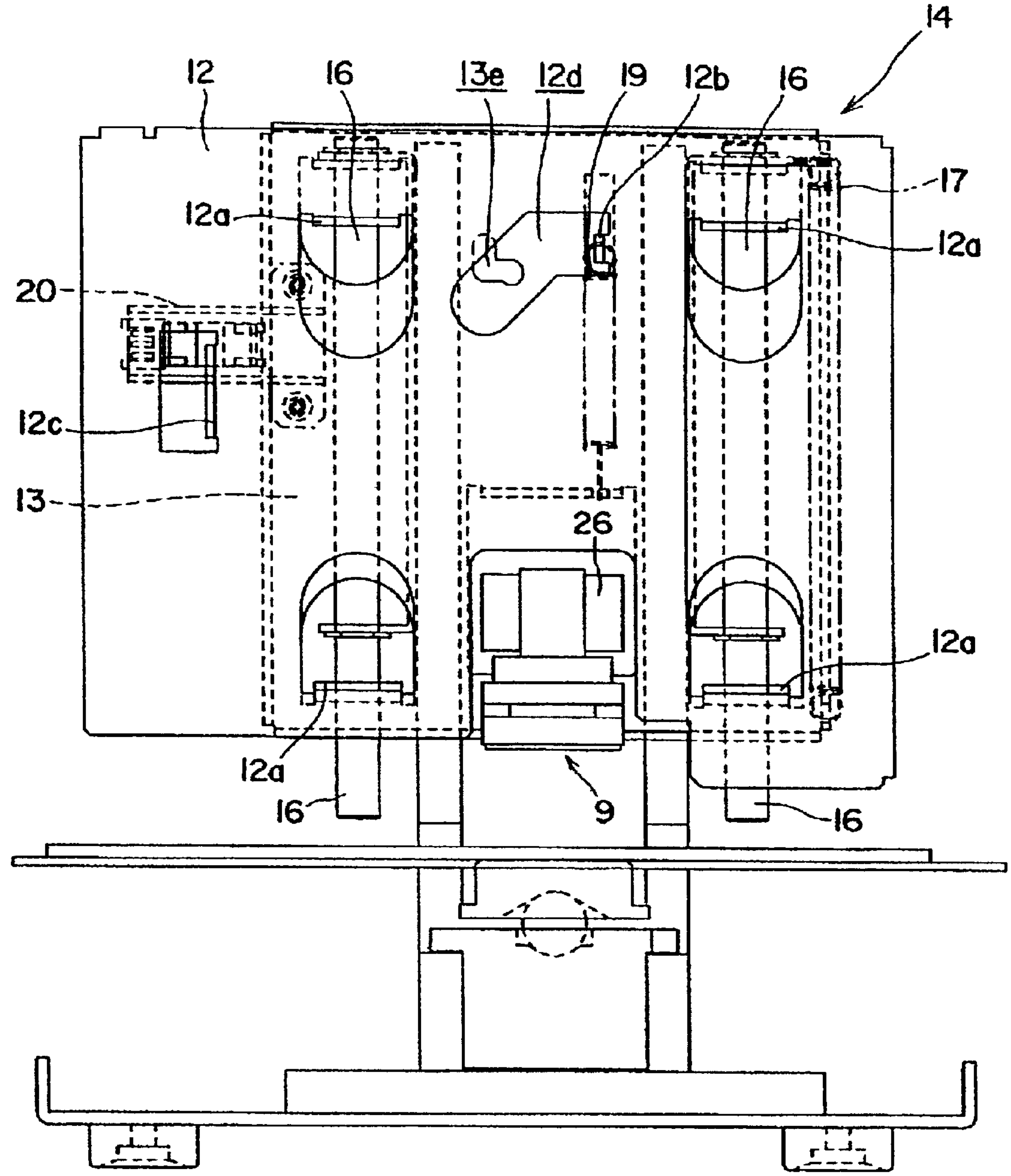
FIG. 9 is a figure explaining one example of the construction of cassette movement mechanism, and a simplified front view of hot-stamping device, showing a mode of attachment of middle plate.
Figure 10:
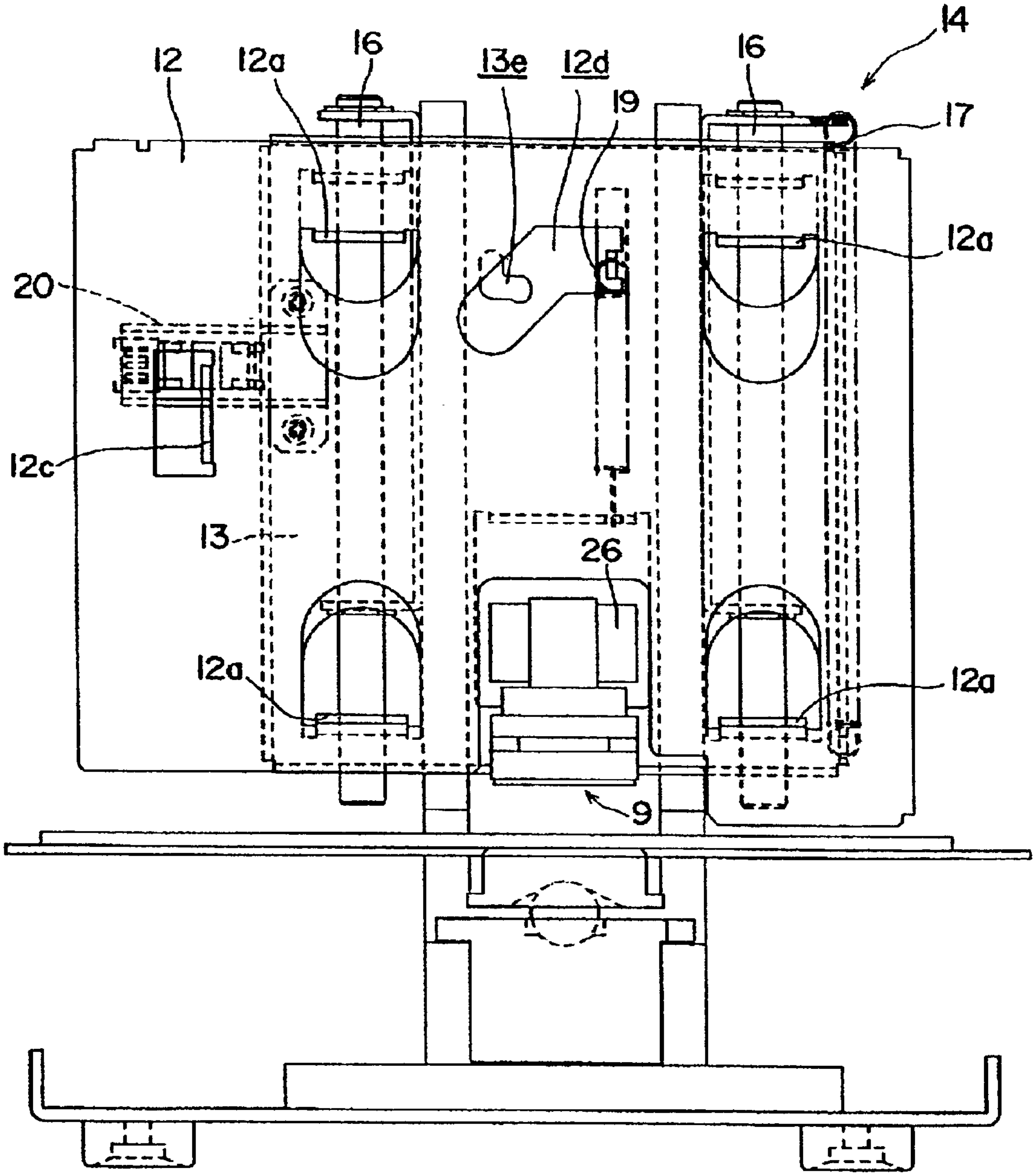
FIG. 10 is a figure explaining one example of construction of cassette movement mechanism, and a simplified front view of hot-stamping device, showing mode of movement as a unit of middle plate and innermost plate.

On plate 12 also, flexure section **12*a* is provided, attached to guide shaft 16 so flexure is possible; plate 12 is attached to guide shaft 16 so movement is possible by passing through cutout section 13*b* in plate 13 and in alignment with plate 13 (see FIG. 9). Further, plate 12 is connected to plate 13 through means to exert force, torsion coil spring 19, for example. For example, catch 12*b* provided on plate 12 is inserted into cutout section 13*c* of plate 13, spring 19 is attached to catch 12*b* and catch 13*d* provided on plate 13. By this means, as plate 13 moves along guide shaft 16, plate 12 moves with it as a unit (see FIG. 9, FIG. 10). On the other hand, for example, when cassette 1 is in contact with document 2 to prevent movement of plate 12, plate 13 alone moves in opposition to the force exerted by spring 19, in other words, there is difference in movement between plate 12 and plate 13 (see FIG. 11**).

Further, in this embodiment, photosensor 20 instantly detects the difference in movement between plate 12 and plate 13. For example, photosensor 20 is fixed on plate 13 and moves as a unit with plate 13. Further, shielding **12*c* is provided on plate 12 side to shield photosensor 20 at the instant there is difference in movement between plate 12 and plate 13. Shielding 12*c* is provided, for example, by bending one part of plate 12. By detecting the instant that shielding 12*c* shields photosensor 20, the instant there is difference in movement between plate 12 and plate 13** is detected.

Plate 11 is attached to plate 12 so it moves as a unit with plate 12 in the shaft direction of guide shaft 16. Moreover, cassette 1 is supported by plate 11. In other words, cassette 1 is able to move in the shaft direction of guide shaft 16 through plate 11, 12 and 13.

Figure 12:
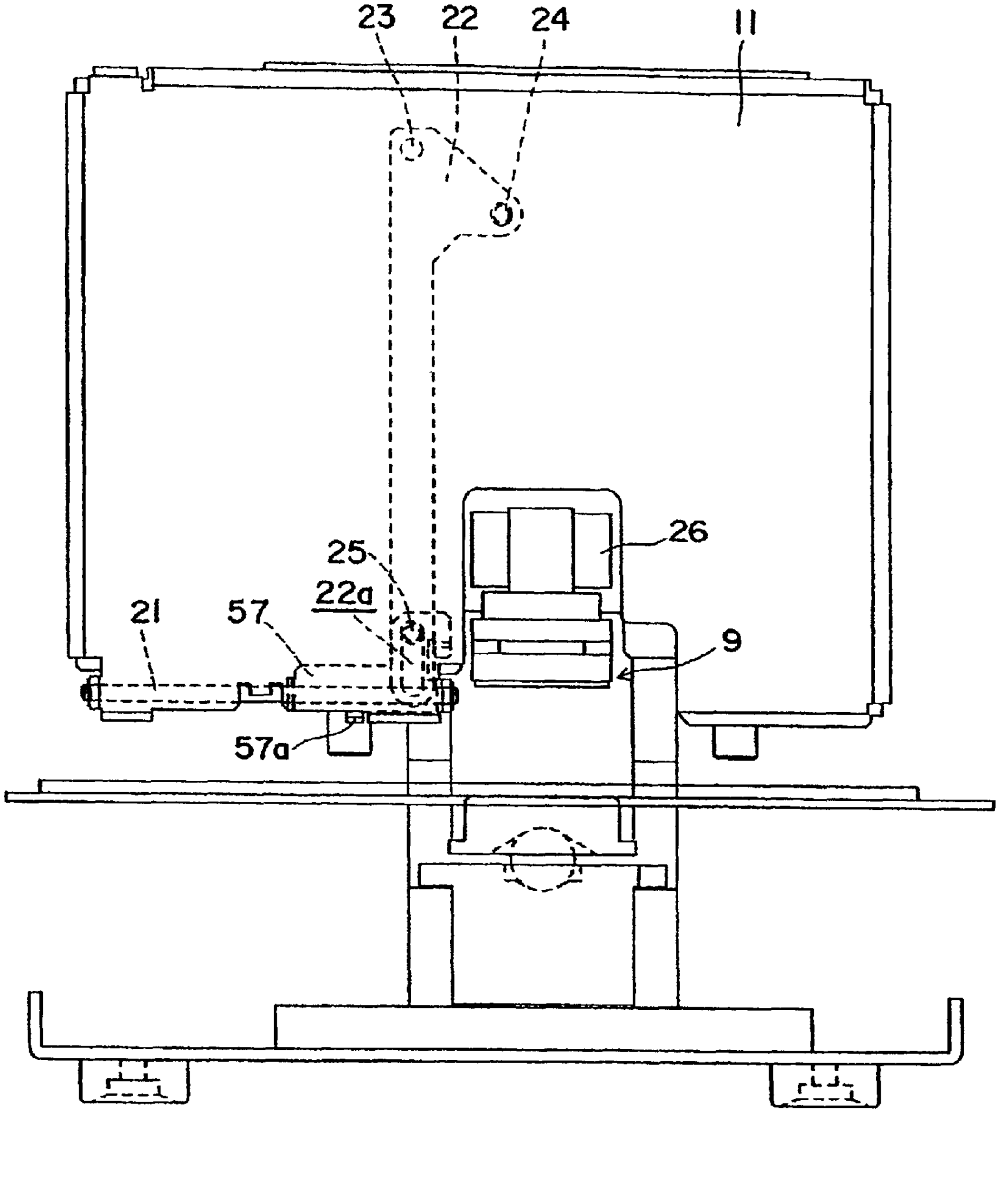
FIG. 12 is a simplified front view of hot-stamping device, showing one example of construction of connection part connecting to a shutter provided on cassette movement mechanism.

Slide shaft 21 is fixed on the back side of cassette 1 mounting face in plate 11, connection part 57 (slide plate) is built in so that horizontal movement is possible with slide shaft 21 as guide (see FIG. 12). Slide plate 57 has protrusion **57*a*, when cassette 1 is mounted on plate 11, protrusion 57*a* and shutter 6** make connection.

Further, on the back side of cassette 1 mounting face in plate 11, lever 22 is attached so that rotation is possible with shaft 23 as center (see FIG. 12). On lever 22, pin 24 is attached to make connection with L-shaped groove **13*e* formed on plate 13. By this means, lever 22 rotates with shaft 23 as center through connection pin 24, by the relative motion downwards in the figure of plate 13 to plate 11 (see FIG. 13 to FIG. 15). Moreover, cutout section 12*d* is formed in plate 12 so that there is no interference to movement of connection pin 24. Further, there is long hole 22*a* in lever 22, ridged pin 25 attached to slide plate 57 makes connection with long hole 22*a*. By this means, rotation of lever 22 and movement of slide plate 57 are linked through ridged pin 25**.

Further, hot-stamping device 7 comprising one embodiment of this invention, has stamping arm 26 with one end being free end, and stamping section 9 positioned at said free end to apply pressure to hot-stamping foil 3 and value-added medium 2 to transfer hot-stamping foil to value-added medium 2, and first cam 27 in contact with stamping arm 26 to move stamping section 9 to close proximity of value-added medium 2, and first drive section 28 driving first cam 27, and second cam 29 bringing pressure-exerting load to bear on stamping section 9 moved to close proximity of document 2, and second drive section 30 driving second cam 29.

Stamping arm 26 of this embodiment is equipped, for example, with cam follower 31 in contact with cam 27 and cam follower 32 in contact with cam 29. There is space on stamping arm 26 to attach cam follower 31 and cam follower 32. Cam follower 31 and cam follower 32 are, for example, both constructed of rollers; cam follower 31 is attached about midway along the lengthwise direction of stamping arm 26, cam follower 32 is attached near the back end of stamping arm 26; each of these rotates freely. Further, bearing 33 is attached on the side face of stamping arm 26, on the same shaft as cam follower 31. Bearing 33 is fitted so it can flex, in long hole 34 formed in frame 10.

Figure 4:
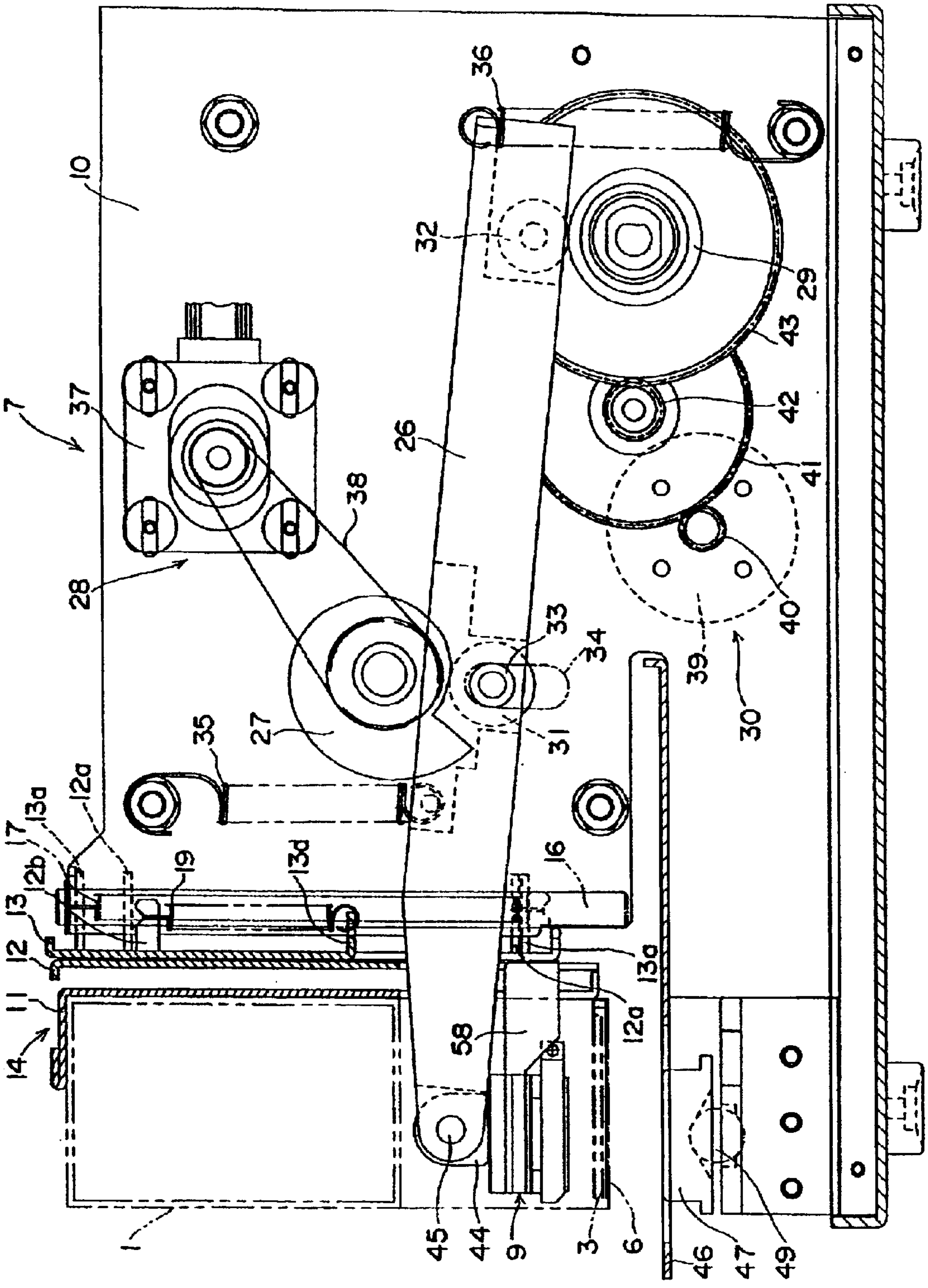
FIG. 4 shows one example of construction for driving cassette movement mechanism and stamping section in said hot-stamping device, and a simplified cross-sectional view from the side of hot-stamping device, seen from the inside face of frame on right side of hot-stamping device shown in FIG. 1.

As shown in FIG. 4 in this embodiment, for example, cam 27 is positioned in the figure about midway above the lengthwise direction of stamping arm 26, cam 29 in the figure is positioned below near the back end of stamping arm 26. Then, in stamping arm 26, torsion coil spring 35, for example, is attached as a means to exert force to receive force in the upward direction in the figure, further, torsion coil spring 36, for example, is attached as a means to exert force to receive force in the downward direction in the figure. By these means, cam follower 31 comes in contact with cam 27, cam follower 32 comes in contact with cam 29, to determine the position for stamping arm 26.

When cam 27 is driven, contact point between cam 29 and stamping arm 26 (cam follower 32) becomes the fulcrum of rotation of stamping arm 26, on the other hand, when cam 29 is driven, the contact point between cam 27 and stamping arm 26 (cam follower 31) becomes the fulcrum of rotation of stamping arm 26.

Further, in this embodiment the change in radius per angle of rotation (change in radius/angle) for cam 27 is designed to be large so that movement of stamping arm 26 can be effected quickly, on the other hand, the change in radius per angle of rotation for cam 29 is designed to be small so that large load can be brought to bear on stamping arm 26. By this means, when cam 27 is driven, stamping section 9 is moved quickly to close proximity of the medium, when cam 29 is driven, large pressure-exerting load is brought to bear on stamping section 9.

Drive section 28 in this embodiment, for example, is constructed by using stepper motor 37. Rotation of stepper motor 37 is conveyed to cam 27 by using, for example, timing belt 38. Moreover, there is no need to restrict usage to timing belt 38, for example, rotation of stepper motor 37 is conveyed in satisfactory fashion to cam 27 by using gear, chain, and the like. It becomes possible to rotate cam 27 to the required degree by managing input pulse count to stepper motor 37.

Drive section 30 in this embodiment, for example, is constructed by using DC motor 39. Rotation of DC motor 39 is conveyed, for example, to cam 29 through gear 40~43. Further, in this embodiment, drive section 28 enables control of the forward/reverse rotation of cam 27 by using stepper motor 37, and on the other hand, drive section 30 rotates cam 29 in one direction only, change in radius per angle of rotation is small in cam 29. By this means, for example, when cam 29 is rotated ¾ turn, there is no need to return to the starting state by reverse ¾ turn rotation, rotating another ¼ turn suffices. By this means, it is possible to accelerate the process. Further, because it is sufficient to control rotation in one direction, drive section 30 can be constructed at low cost and in simple fashion. Moreover, in drive section 30, there is no need to restrict usage to DC motor 39, for example, it is possible to use AC motor.

In this embodiment, stamping section 9 is not directly attached to stamping arm 26, insertion block 44 inserts stamping section 9 at the time of hot-stamping; on the other hand, in the readiness state, there is space (for example, 0.5 mm in this embodiment) deliberately placed between the respective contact faces of stamping section 9 and insertion block 44. By such construction, when temperature of stamping section 9 is raised, heat does not escape toward stamping arm 26.

Insertion block 44 is attached to the leading edge section of stamping arm 26 so free rotation occurs, for example, with shaft 45 as center. Insertion block 44 is allowed to rotate freely so contact face to stamping section 9 is kept horizontal independently of the position of stamping arm 26.

Stamping section 9 comprises stamping block constructed of, for example, heating plate contacting hot-stamping foil at the time of stamping, and ceramic heater heating the heating plate, and thermistor measuring the temperature of the heating plate, and adiabatic plate preventing conveyance of heat to the outside of the stamping block. Stamping block 9 is attached at fixed position on plate 13 through stamping support plate 58.

Further, in hot-stamping device 7, table 46 is provided that receives and supports document 2. Further, at the position opposite from stamping block 9, stand 47 is provided, that receives the reactive force at the time of transfer. Stand 47 is, for example, supported through ball 49 such as an angle variation adjustment means between the stand and block 48, it is possible to change the angle of stand 47 to block 48.

Note that the angle variation adjustment means do not limit ball 49. It may employ, for example, a gimbal plate spring and elastic members and the like.

Furthermore, in this embodiment, the angle variation adjustment means is provided in stand 47. It may be provided in stamping block 47.

Figure 13:
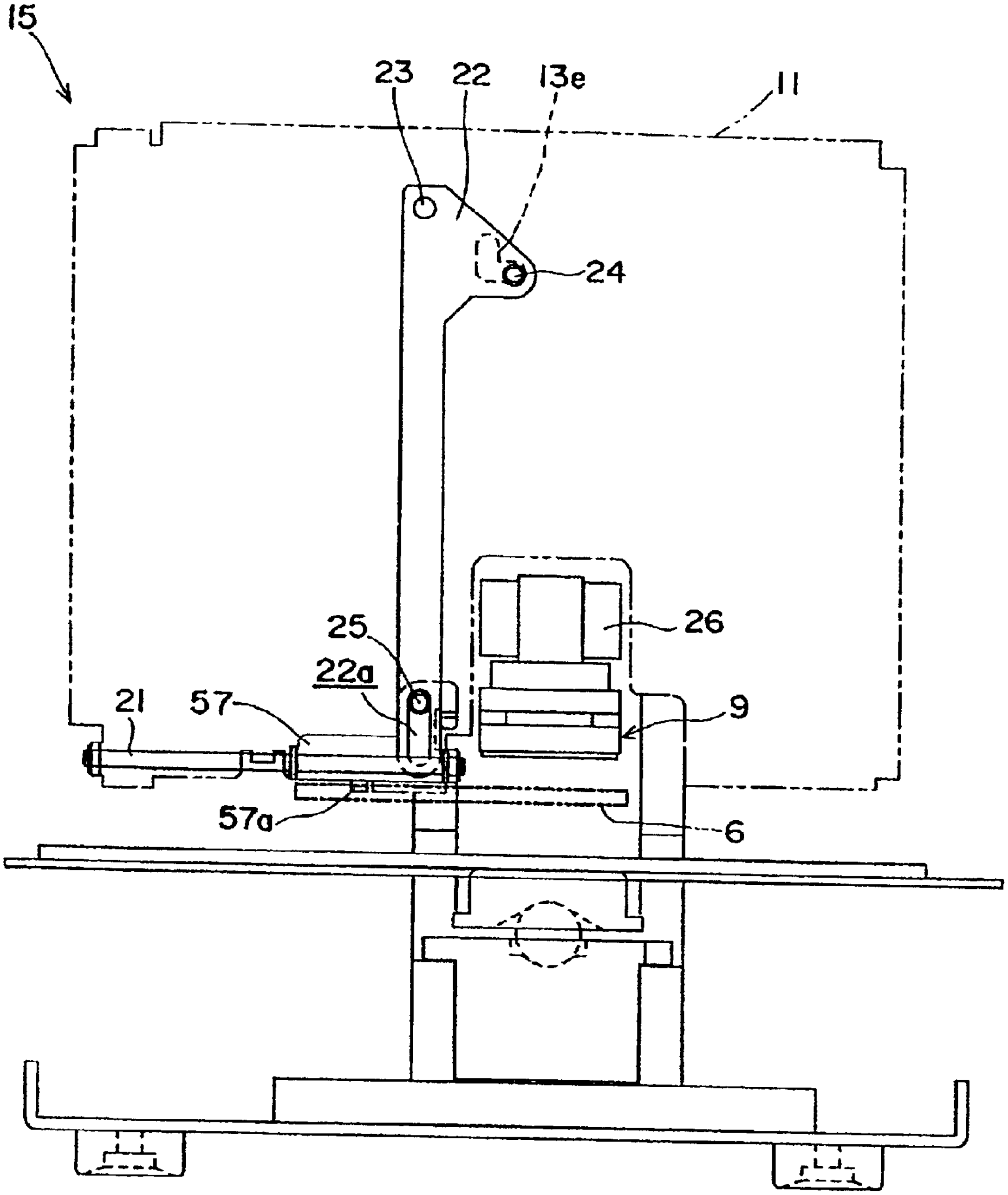
FIG. 13 is a figure explaining an action of foil-peeling mechanism in this invention, and is simplified front view showing hot-stamping device in a readiness state.
Figure 14:
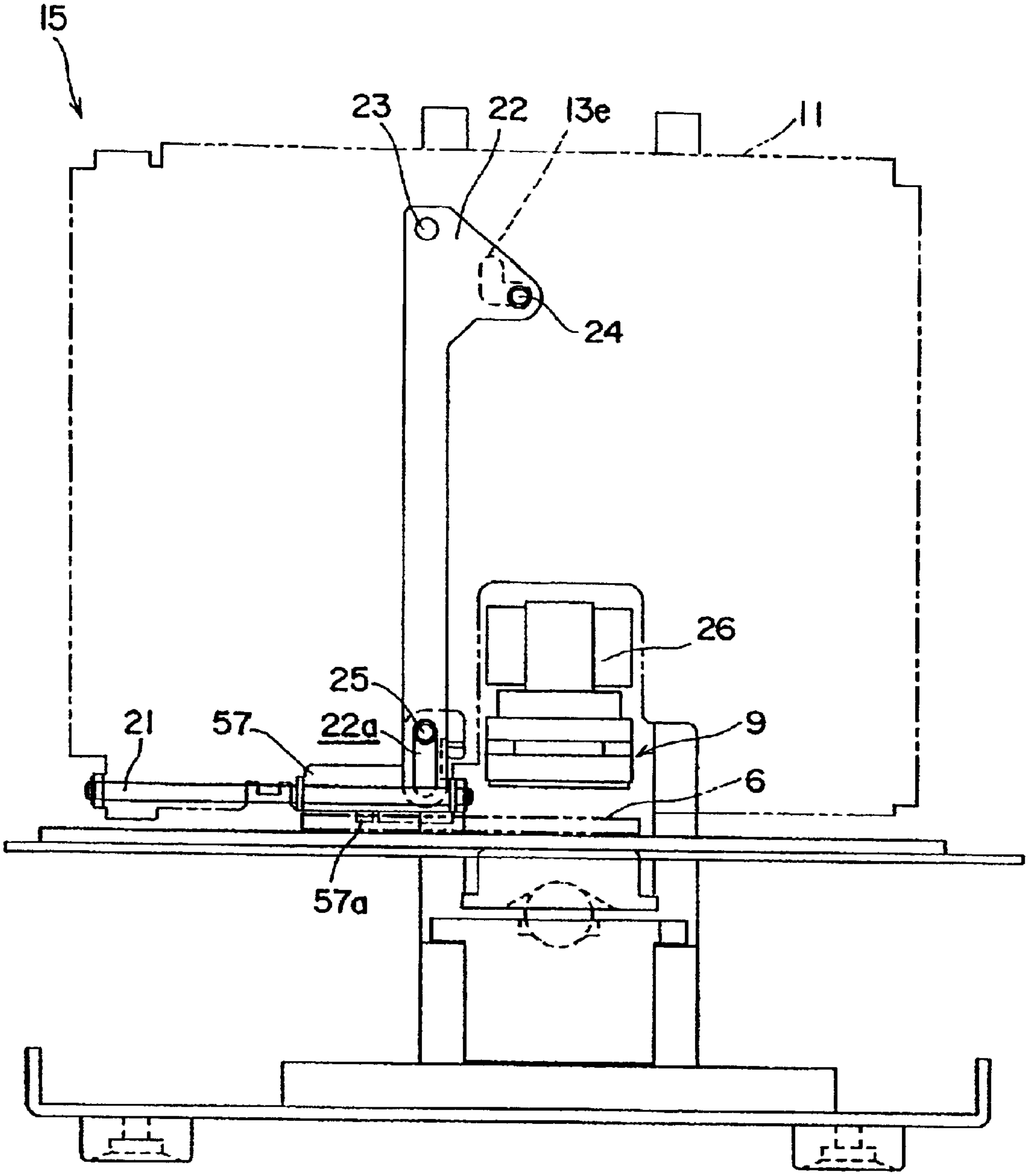
FIG. 14 is a simplified front view explaining action of foil-peeling mechanism in this invention, showing the state when hot-stamping foil tape cassette from the state in FIG. 13 comes in contact with the value-added medium.
Figure 15:
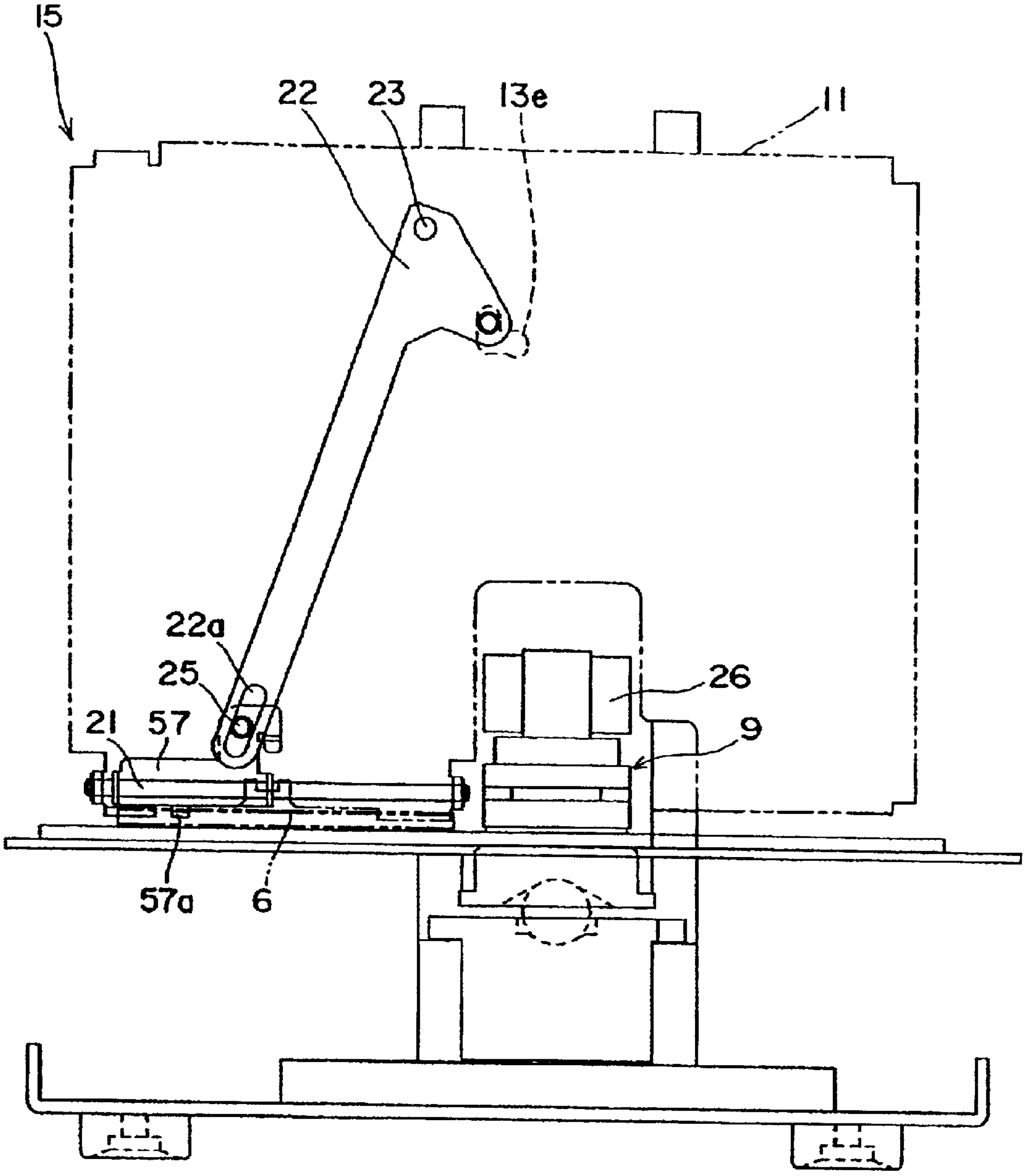
FIG. 15 is a simplified front view explaining action of foil-peeling mechanism in this invention, showing the state when stamping section from the state in FIG. 14 comes in contact with the value-added medium through hot-stamping foil tape.

Next, an example of the action of hot-stamping device 7 constructed as above is explained. FIG. 1, FIG. 4 and FIG. 13 show device 7 in readiness state. Further, plate 12, 13 are in the state shown in FIG. 9. In the readiness state, plate 13 as shown in FIG. 8, is in contact with stopper 18 by the force exerted by spring 17. Plate 12 connected to plate 13 and spring 19, plate 11 attached to plate 12 as a unit in the vertical direction, cassette 1 supported on plate 11, are respectively in withdrawal position above the figure, from document 2 on table 46. Further, stamping block 9 fixed on plate 13 through stamping support plate 58 is also in withdrawal position above the figure from document 2. Further, in the readiness state, there is fixed space provided between hot-stamping foil tape 3 and stamping block 9, to prevent damage to hot-stamping foil tape 3 from the heat of stamping block 9 before hot-stamping.

In the readiness state, stamping block 9 is preheated to about 70–80° C., for example. By preheating to temperature in this range, it is possible to heat several seconds to a temperature where hot-stamping is possible, for example, about 100° C., hot-stamping can be effected expeditiously. Further, preheating is not essential, there is no need for preheating in situations where prevention of power consumption is a priority.

Further, in the readiness state, stamping arm 26 is positioned between stamping block 9 and insertion block 44 so that there is 0.5 mm space, for example. By this means, heat of stamping block 9 does not escape to the side of stamping arm energy 26, and energy consumption is suppressed.

When document 2 is placed on table 46, and hot-stamping command is given, cam 27 rotates clockwise in FIG. 4, by stepper motor 37 drive. Following the ring perimeter shape of cam 27, cam follower 31 moves as it opposes the force exerted by spring 35 and spring 36. By this means, as bearing 33 moves downwards in the figure along long hole 34, stamping arm 26 rotates with the contact point of cam 29 and cam follower 32 as a fulcrum of rotation. Shortly, insertion block 44 comes in contact with the top face of stamping block 9 (see FIG. 5).

Furthermore, when cam 27 rotates and stamping arm 26 rotates, insertion block 44 inserts stamping block 9 downwards toward document 2. Stamping support plate 58 supporting stamping block 9 is fixed on plate 13, plate 13 is pushed downwards along guide shaft 16 as it opposes the force exerted by spring 17. Plate 12 connected to plate 13 and spring 19, plate 11 attached to plate 12 as a unit in the vertical direction, and cassette 1 supported on plate 11 also move downwards together with plate 13. Cassette 1 moves downwards toward document 2, initially damper 8 comes in contact with document 2, in a short time, the entire bottom face of cassette 1 comes in contact with document 2 by means of a load sufficient to prevent shifting of document 2. By this means, hot-stamping device 7 is in the state shown in FIG. 2, FIG. 6 and FIG. 14. Further, at this point, plate 12, 13 are in state shown in FIG. 10.

Furthermore, as cam 27 rotates, and stamping arm 26 rotates, insertion block 44 inserts stamping block 9 further downwards. Here, after the entire bottom face of cassette 1 comes in contact with document 2, cassette 1, plate 11 and plate 12 cannot move downwards. However, plate 13 can move further down as it opposes the force exerted by spring 19 (see FIG. 11).

When plate 11 and plate 12 stop and only plate 13 moves downwards, connection pin 24 moves L-shaped groove 13*e*, lever 22 rotates clockwise with shaft 23 as center. Accompanying rotation of lever 22, slide plate 57 slides to the left in FIG. 14, and withdraws shutter 6 linked to slide plate 57 from the face opposite stamping block 9 (see FIG. 15). In other words, shutter 6 that shielded hot-stamping foil tape 3 is in an open state.

On the other hand, the instant there is a difference in movement between plate 13 and plate 12, in other words, the instant that bottom front face of cassette 1 comes in contact with document 2, that contact is detected by photosensor 20. Here, distance between stamping block 9 and bottom face of cassette 1 before this detection by photosensor 20 is identical to distance in the readiness state and is known already because plate 11, 12, 13 move as a unit. Therefore, cam 27 is rotated only to the required amount by controlling the pulse count of stepper motor 37 so stamping block 9 is moved only the distance between stamping block 9 and bottom face of cassette 1 at the time of detection by photosensor 20.

Figure 11:
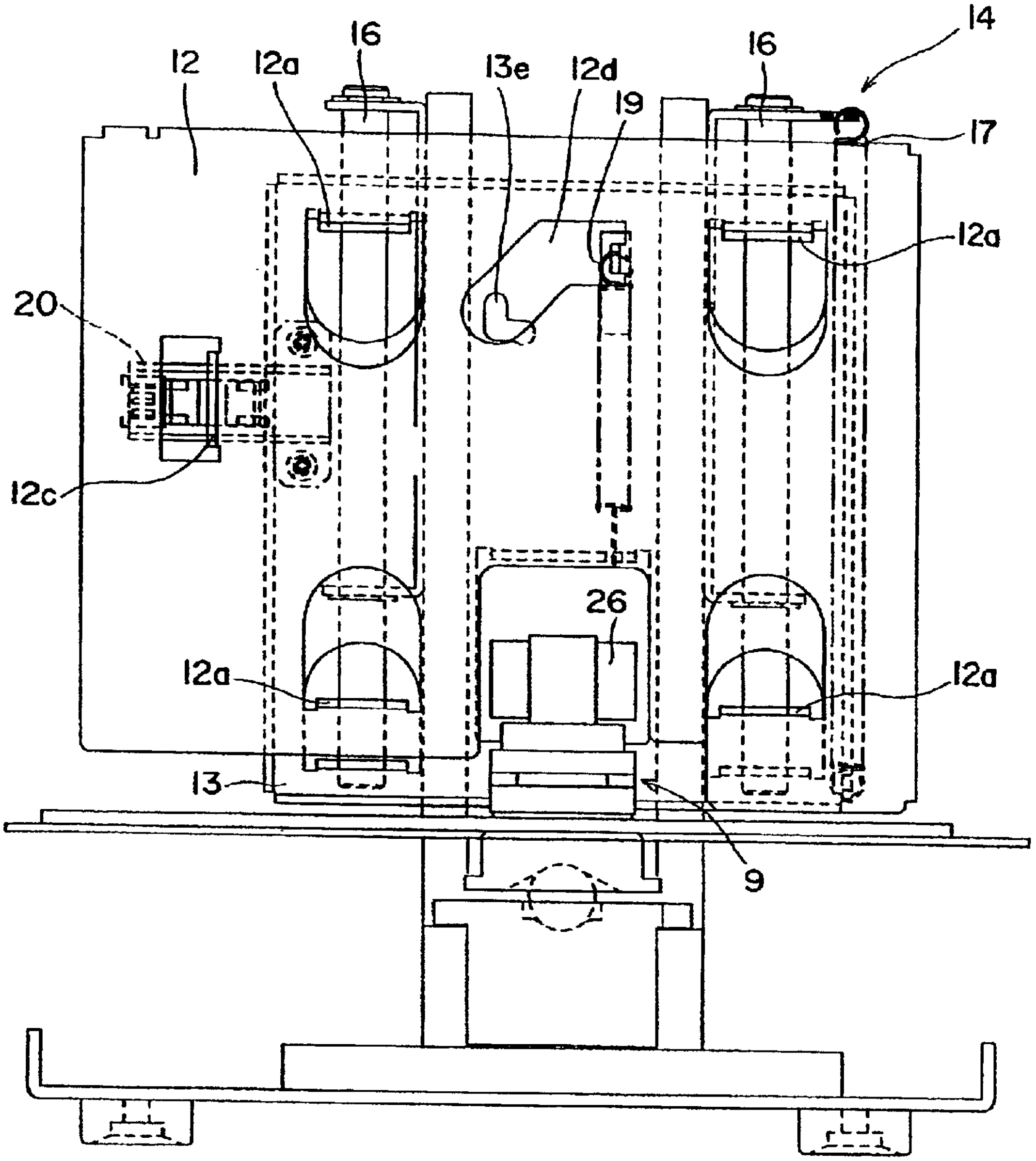
FIG. 11 is a figure explaining one example of construction of cassette movement mechanism, and a simplified front view of a hot-stamping device, showing a mode when innermost plate moves differently from middle plate.

The shutter opens, bottom face of stamping block 9 comes in contact with hot-stamping foil tape 3, further, through hot-stamping foil tape 3, and stamping block 9 comes in contact with the top face of document 2 on which hot-stamping is to be implemented. By this means, the state becomes that shown in FIG. 3, FIG. 7 and FIG. 15. Furthermore, at this time, the state of plate 12, 13 are shown in FIG. 11. Stepper motor 37 stops in this state, cam 27 also stops and keeps its position. Moreover, because change in radius per angle of rotation for cam 27 was designed to be large, movement of stamping arm 26 from the readiness state to this point can be effected very quickly.

Figure 7:
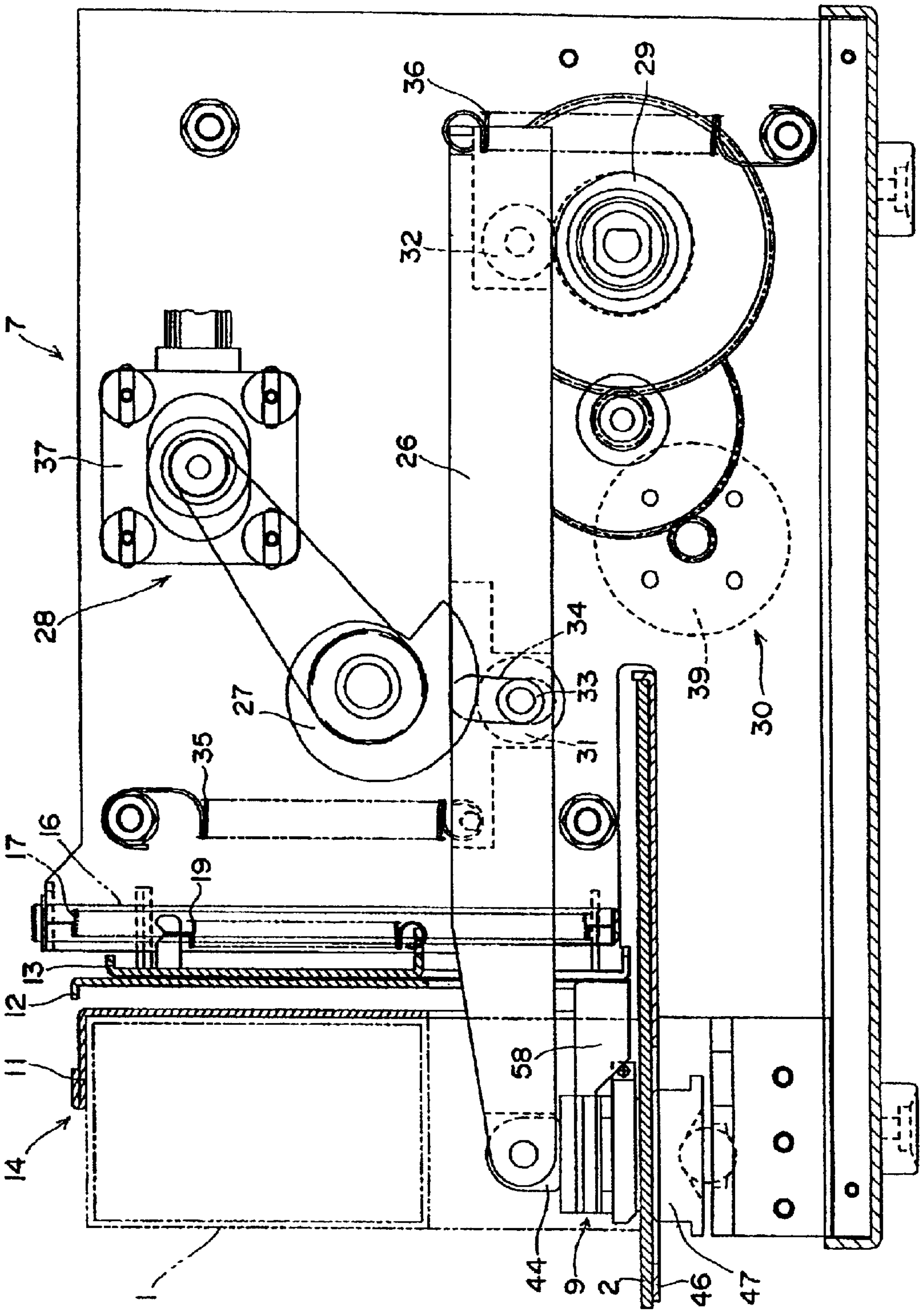
FIG. 7 is a simplified cross-sectional view from the side of hot-stamping device, showing the state when the stamping section from state in FIG. 6 comes in contact with the value-added medium through the hot-stamping foil tape in said hot-stamping device.

Next, DC motor 39 is driven, cam 29 is rotated clockwise in FIG. 7. At this time, the contact point between cam 27 and cam follower 31 becomes the fulcrum of rotation, cam follower 32 moves according to the ring perimeter shape of cam 29, as it opposes the force exerted by spring 35 and spring 36 (cam 29 attains state shown by 2-point chain line in FIG. 7). By this means, stamping arm 26 rotates, and exerts pressure on document 2 through hot-stamping foil tape 3. In other words, holographic foil is hot-stamped on document 2. Moreover, because change in radius per angle of rotation for cam 29 was designed to be small, a large load can be brought to bear on stamping arm 26.

At this point, holographic foil is fused on document 2 by hot-stamping, transparent carrier film supporting holographic foil is also in the fused state on document 2 through fused holographic foil. To complete the hot-stamping process, this carrier film must be peeled off. In this embodiment, carrier film is peeled off by utilizing the closing motion of shutter 6 back to the position in readiness state.

After hot-stamping, cam 27 rotates counterclockwise in FIG. 4 to return stamping arm 26 to a readiness position. Following rotation of cam 27, force exerted by spring 17 is released, plate 13 and stamping block 9 move upward, plate 12, plate 11 and cassette 1 also move upward to separate from document 2. At the same time, force exerted by spring 19 is released, lever 22 rotates counterclockwise in FIG. 15 with shaft 23 as center to close shutter 6. In other words, shutter 6 begins to close from the time bottom face of cassette 1 separates from document 2. At this point, the front edge of shutter 6 has entered the space between carrier film and document 2, as shutter 6 closes, shutter 6 is inserted between carrier film and document 2, and effects peeling between document 2 and carrier film. Further, at the time peeling is effected by this shutter 6, upward movement of cassette 1 continues, therefore, carrier film is in the state of being pulled toward the top, and very reliable peeling by shutter 6 occurs.

Cam 29, for example, cam 27 rotates to readiness position, rotates to its position in readiness state. In this case, cam 29 does not rotate in reverse direction, but only rotates forward (clockwise rotation in FIG. 7) to return to the readiness position. By this, hot-stamping process is completed, there is return to the readiness state shown in FIG. 1, FIG. 4 and FIG. 13.

As described above, according to hot-stamping foil tape cassette of this invention, because hot-stamping foil tape 3 is not exposed by means of shutter 6, hot-stamping foil tape 3 is not prone to physical damage such as dirt, heat, cuts and scratches, satisfactory hot-stamping can be provided consistently. Furthermore, after hot-stamping, shutter 6 can be utilized to peel hot-stamping foil tape 3 from document 2. Further, because holographic foil is attached as cassette system, changing to different hot-stamping foil tape 3 can be readily performed by exchanging cassette 1, exchange operations become very easy compared to conventional open reel structure.

Further, according to foil-peeling mechanism 15 in hot-stamping device 7 that uses cassette 1, structure is such that two actions, movement of shutter 6 and pull-up of hot-stamping foil tape 3 by withdrawal of cassette 1 from document 2, are linked; as document 2 and carrier film are being peeled by shutter 6, carrier film is being pulled upward simultaneously, peeling of document 2 and carrier film is implemented consistently and, moreover, in satisfactory fashion.

Further, hot-stamping device 7 is provided with cassette movement mechanism 14 to hold down document 2 by means of cassette 1 at the time of hot-stamping, regardless of the kind of document 2 from single sheet to brochure; action of cassette movement mechanism 14 and opening/closing of shutter 6 are linked in structure of foil-peeling mechanism 15; therefore, carrier film is peeled in satisfactory fashion consistently with identical optimal timing, regardless of the kind of document 2 from single sheet to brochure.

Further, when carrier film is peeled from document 2, there is no need to move document 2; damage to document 2 can be avoided.

Further, because document 2 is fixed in place at the time of hot-stamping in this system, for example, when single-sheet auto feeder is optionally part of the system, there is no need to separately provide a paper conveyance mechanism just for device 7, it is possible to address the situation by conventional paper conveyance technology.

Further, in this embodiment, amount of movement of stamping arm 26 is utilized, from the time bottom face of cassette 1 comes in contact with top face of document 2 to when stamping section 9 exerts pressure on the top face of document 2, in other words, difference in movement between plate 12 and plate 13 is utilized to effect opening/closing of shutter 6; therefore, there is no need to separately provide an actuator for opening/closing of shutter 6, further, hot-stamping action and action of cassette movement mechanism 14 and opening/closing action of shutter 6 can be linked at an optimal timing for hot-stamping.

Further, in this embodiment, by means of cam 27 drive, the timing of peeling by shutter 6 and movement to pull up a carrier film by withdrawal of cassette 1 from document 2 are linked. Consequently, by changing the shape of cam 27 appropriately, it is possible to easily change the timing of the start of the peeling by shutter 6, speed of movement of shutter 6, timing of start of carrier film movement by withdrawal of cassette 1 from document 2, and speed of pull-up.

Furthermore, the embodiment described above is one example of a very suitable embodiment of this invention, but there is no limitation thereby, various embodiments are possible in the range that does not go beyond the gist of this invention.

For example, in embodiment described above, cassette 1 and stamping section 9 are moved quickly to close proximity of document 2 by first cam 27, pressure-exerting load necessary for hot-stamping is generated by second cam 29; however, means to rotate stamping arm 26 and means to generate necessary pressure-exerting load in stamping section 9 are not so limited. Satisfactory structure is such that by utilizing hot-stamping foil tape cassette 1, at the time of hot-stamping, cassette 1 comes in contact with document 2 and, moreover, shutter 6 in cassette 1 opens, after hot-stamping, as cassette 1 is being withdrawn from document 2, shutter 6 closes to peel hot-stamping foil tape 3 from document 2; for example, satisfactory structure can have known mechanical elements such as gears and the like.

Further, structure for opening/closing shutter 6 is not limited by embodiment described above, to utilization of difference in movement between plate 12 and plate 13, or to utilization of movement of stamping arm 26. For example, it is possible to separately provide actuator for opening/closing of shutter 6.

An example using solenoid as actuator used in opening/closing of shutter 6 is shown in FIG. 17 to FIG. 20. Solenoid 52, for example, is attached to back side of cassette 1 mounting face on plate 11, together with "L"-shaped lever 22 that can rotate with shaft 23 as center. Solenoid 52 is fixed on plate 11, and moves together with plate 11. Solenoid 52 and "L"-shaped lever 22 are connected through connection 55. "L"-shaped lever 22 and connection 55 are attached so rotation is possible with shaft 56 as center. Furthermore, structure utilizing connection 57 (slide plate) that connects with shutter 6 is identical to the embodiment described above.

Figure 2:
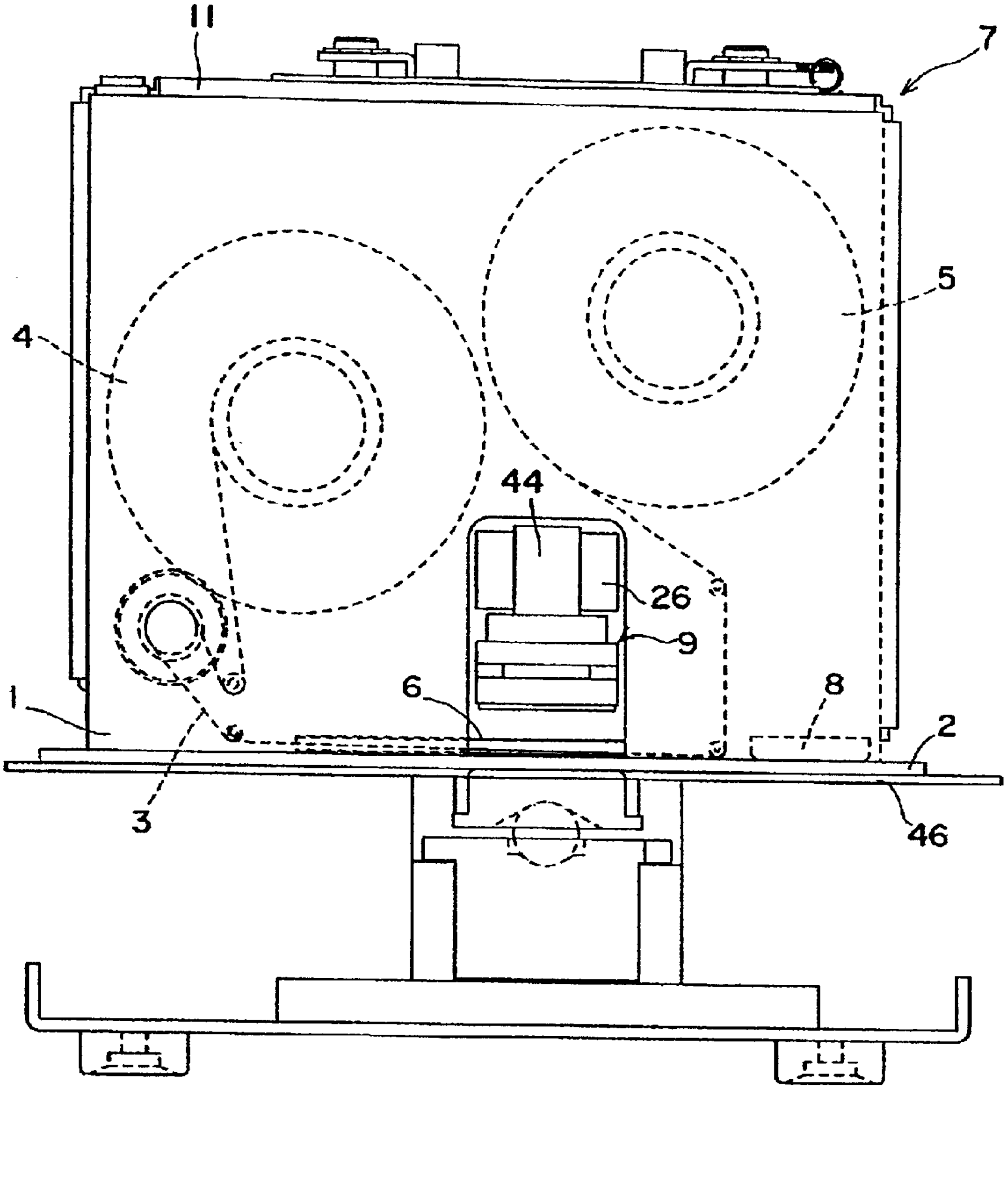
FIG. 2 is a simplified front view of said hot-stamping device, showing the state when hot-stamping foil tape cassette comes in contact with a value-added medium.
Figure 3:
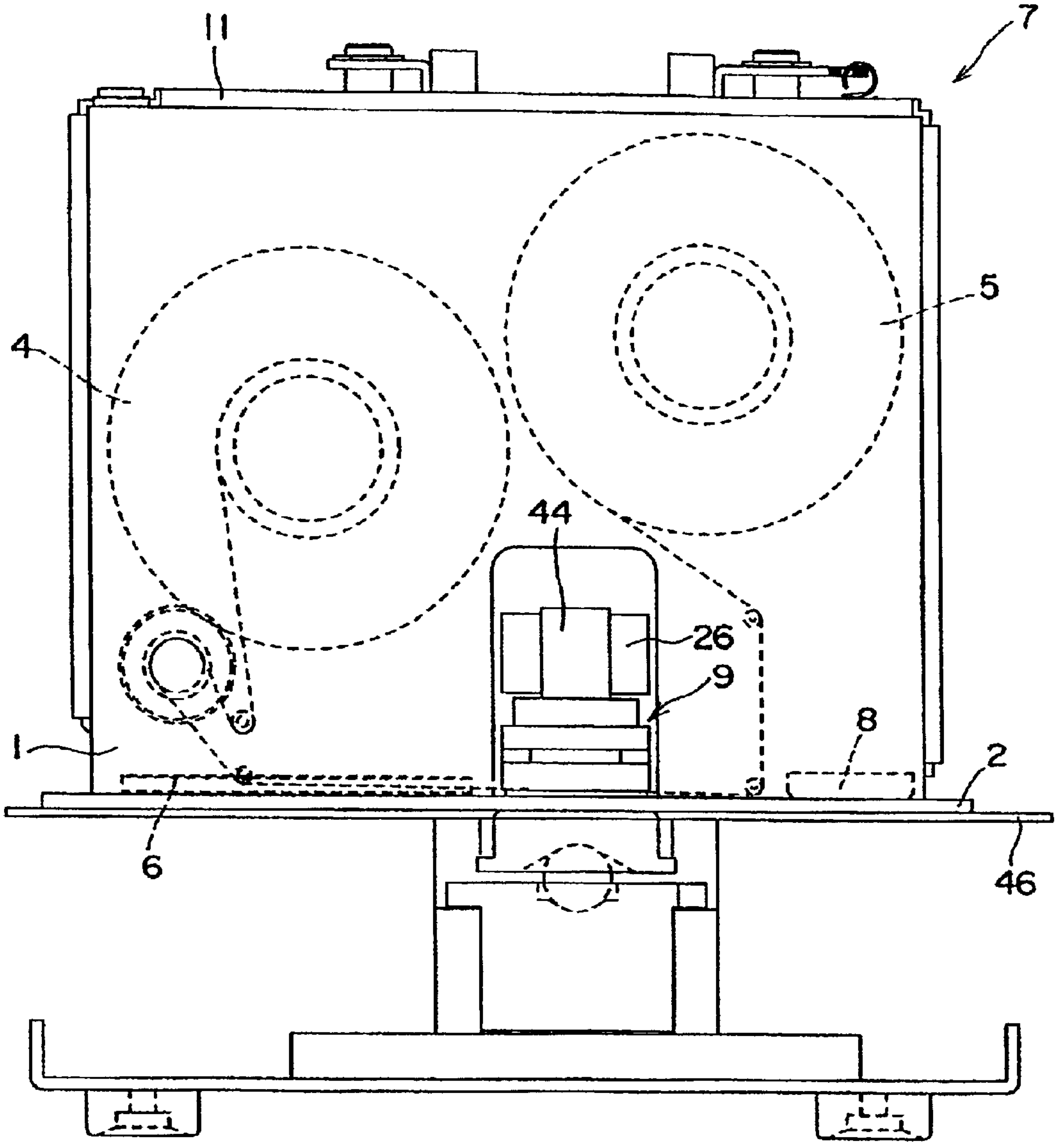
FIG. 3 is a simplified front view of said hot-stamping device, showing the state when stamping section comes in contact with value-added medium through the hot-stamping foil tape.
Figure 18:
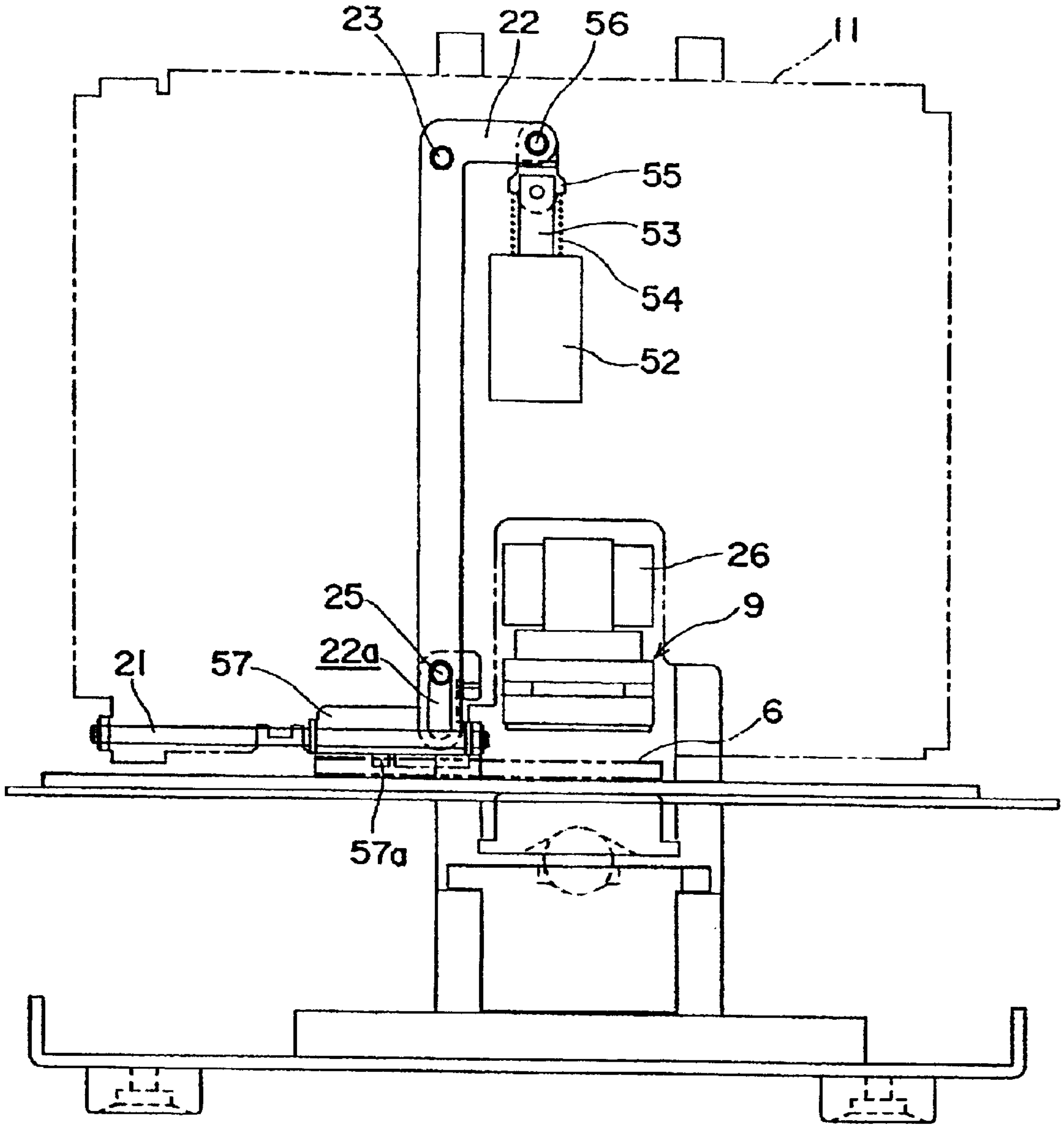
FIG. 18 is a simplified front view showing said another embodiment of this invention, and shows state when hot-stamping foil tape cassette from state in FIG. 17 comes in contact with the value-added medium.
Figure 19:
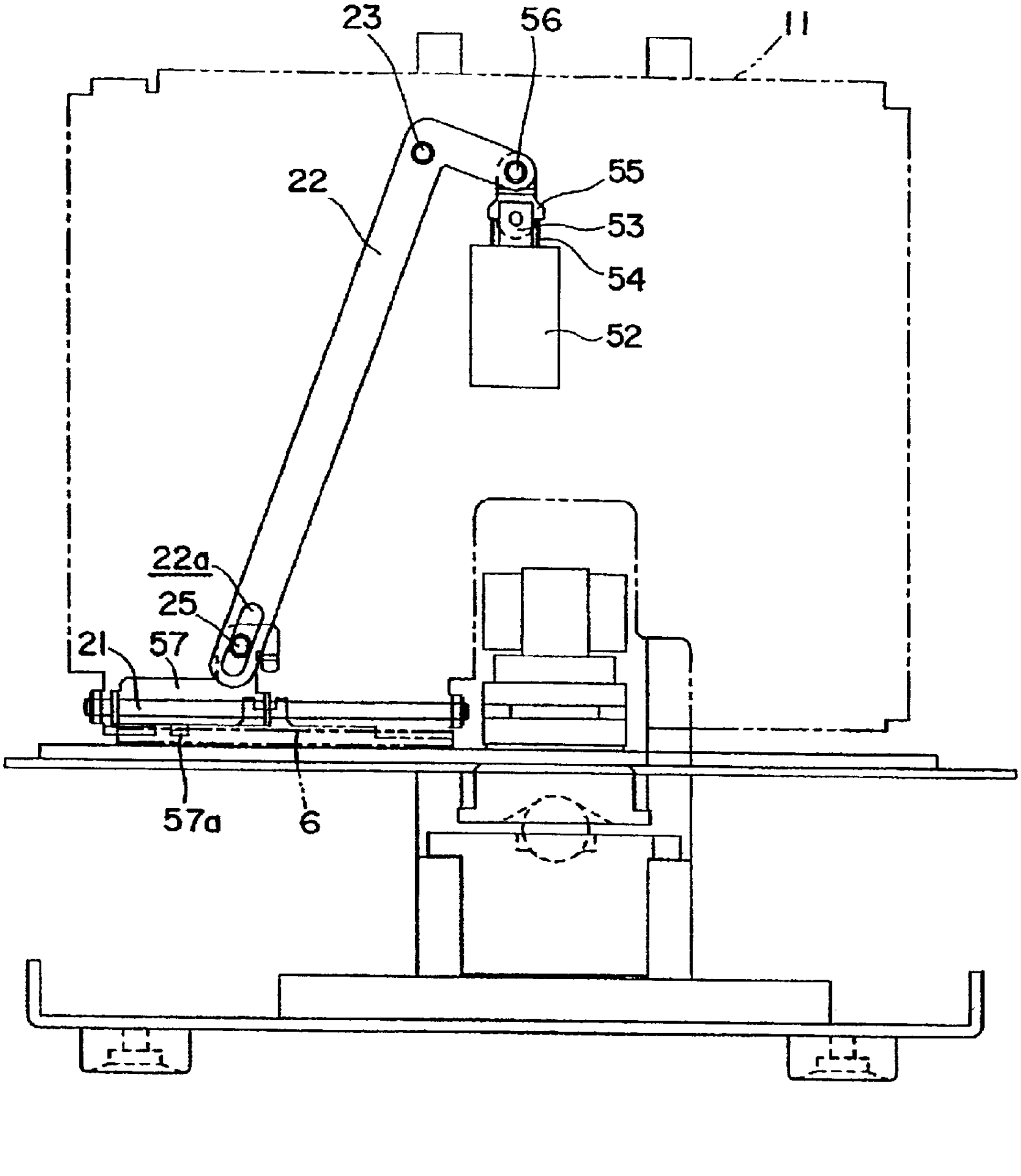
FIG. 19 is a simplified front view showing said another embodiment and shows state when the stamping section from state in FIG. 18 comes in contact with the value-added medium through hot-stamping foil tape.
Figure 20:
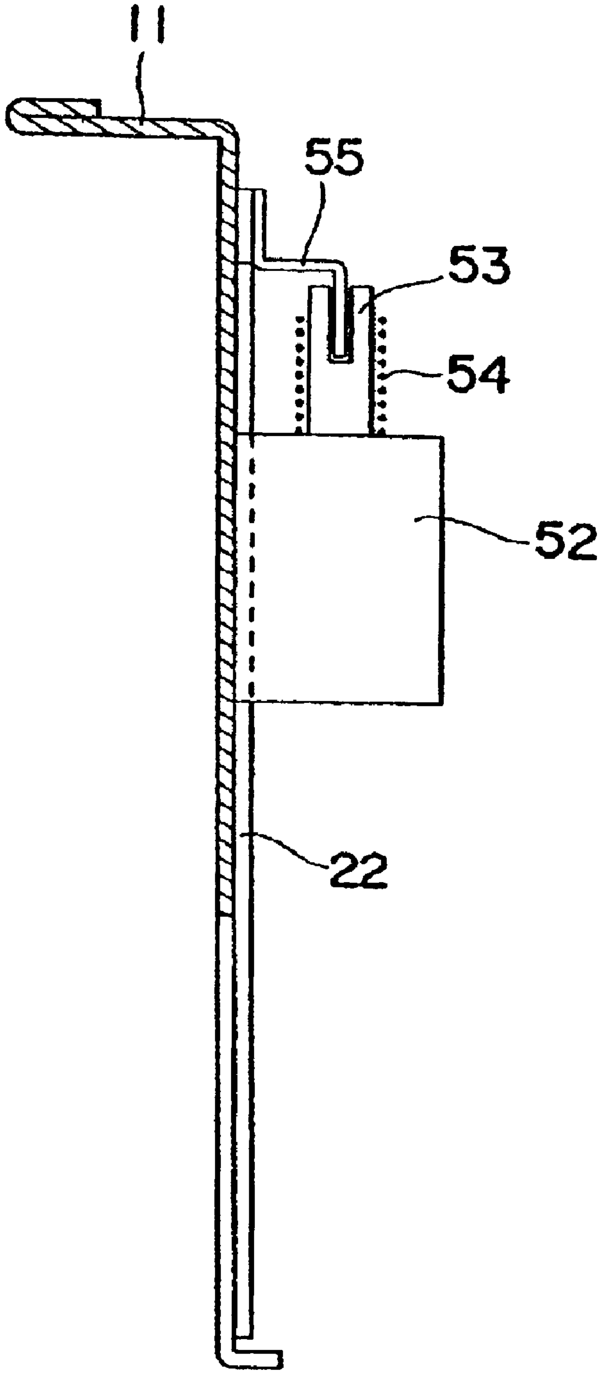
FIG. 20 is a simplified cross-sectional view from the side showing one example of attachment of actuator for opening and closing the shutter.

When current flows to solenoid 52, plunger 53 is pulled in to oppose force exerted by return coil spring 54, lever 22 rotates clockwise in FIG. 18 with shaft 23 as center. Concurrently with rotation of lever 22, slide plate 57 slides to the left in FIG. 18, to withdraw shutter 6 connected to slide plate 57 from face opposite stamping block 9 (see FIG. 19). Then, when current flow to solenoid 52 stops, plunger 53 returns to its initial position by force exerted by spring 54. By this, lever 22 rotates counterclockwise in FIG. 19 with shaft 23 as center, shutter 6 is closed. Moreover, timing for opening/closing of shutter 6 can be adjusted by on/off of current flow to solenoid 52 by means of control section not shown in figure. It is of course possible to implement opening/closing of shutter 6 by timing identical to that in embodiment described above. In other words, in a readiness state shown in FIG. 1 and FIG. 17, there is no current flow to solenoid 52, as shown in FIG. 2 and FIG. 18, current flow to solenoid 52 begins at the time difference in movement between plate 12 and plate 13 occurs when cassette 1 comes in contact with document 2; as shown in FIG. 3 and FIG. 19, at the time of hot-stamping, shutter is open. Then in conjunction with withdrawal of cassette 1 from document 2, current flow to solenoid 52 is stopped to close shutter 6. By this means, as carrier film is being pulled upwards, hot-stamping foil tape 3 can be peeled from document 2 by shutter 6, as in embodiment described above.

Further, an actuator used in opening/closing of shutter 6 is not limited to one using solenoid 52, for example, it is of course possible to use a motor such as stepper motor and the like as actuator. In this case, it is possible to optionally adjust the timing of opening/closing of shutter 6 and speed. Further, for example, it is possible to have separate drives for shutter 6 and movement to pull up carrier film, so that optimal peeling conditions matching foil properties can be set by the user through the control section. There is a possibility that peeling conditions change for holographic foil depending on aluminum vapor deposition layer and adhesive layer; when peeling conditions are not optimal, there is concern that breaks and misses occur in holographic foil; therefore, to provide high quality hot-stamping with foil in market distribution, it is efficacious to set optimal peeling conditions.

Next, there is provided an explanation relating to hot-stamping foil tape cassette and control method for hot-stamping foil tape cassette for simple and, moreover, appropriate control of hot-stamping foil such as holographic foil and the like.

Below, the constitution of this invention is explained in detail based on an embodiment shown in the figures.

One embodiment of hot-stamping foil tape cassette of this invention and control method for hot-stamping foil tape cassette is shown in FIG. 21 to FIG. 28. This hot-stamping foil tape cassette 201 has stored in cassette case hot-stamping foil tape 202 that is transferred to value-added medium together with value-added medium when pressure is applied, non-contacting tag 203 is provided that records control information.

Non-contacting tag 203 comprises, for example, RFID (Radio Frequency ID). Hot-stamping device 204 is provided with communication function that communicates with non-contacting tag 203. Communication function constitutes, for example, antenna 207 that radiates electromagnetic waves to non-contacting tag 203 and simultaneously conducts data transmission with non-contacting tag 203, and circuit 208 that comprises interface between antenna 207 and transmitter-receiver controller 209, and transmitter-receiver controller 209 that controls communication with non-contacting tag 203, and control section 210 that issues command to refresh control information in non-contacting tag 203 according to need, at the same time, controls hot-stamping device 204 on basis of control information transmitted from non-contacting tag 203.

Non-contacting tag 203 is provided with communication device 205 that communicates with hot-stamping device 204 without contact, and memory device 206 that records and stores control information. Further, for example, non-contacting tag 203 in this embodiment comprises passive type tag that does not need external power source, and obtains power for action from antenna 207 provided on hot-stamping device 204.

Memory device 206 comprises, for example, non-volatile memory, use of rewritable non-volatile memory such as EEPROM (Electrically Erasable Programmable Read Only Memory) or FRAM (Ferroelectric RAM, ferroelectric memory), flash memory and the like is preferred (hereinafter, in this embodiment, memory device is termed memory 206).

Communication device 205 includes electric power reception and data transmission coil, control information recorded in memory 206 is read, data is transmitted toward antenna 207 through this coil. Further, communication device 205 receives electromagnetic waves emitted from antenna 7, and recovers. Then, communication device 205 refreshes control information recorded on memory 206, on the basis of this received signal.

There are no particular limitations on form of non-contacting tag 203, there can be plurality of forms such as rod-shape and compressed coin-shape.

Non-contacting tag 203 in this embodiment, for example, is installed at a position facing antenna 207 when cassette 201 is set in hot-stamping device 204, buried in cassette 201. In other words, non-contacting tag 203 is positioned in close proximity to antenna 207, to enable satisfactory communication between non-contacting tag 203 and hot-stamping device 207.

Control information recorded in memory 206 in this embodiment, for example, contains identification information (hereinafter, termed tape ID information) for hot-stamping foil tape 202 stored in cassette 201, approved cycle number for stamping (hereinafter, termed approved stamping cycle number), information to perform optimal hot-stamping according to hot-stamping foil tape 202 (hereinafter, termed stamping condition information), information to manage cassette 201 itself (hereinafter, termed cassette information).

Tape ID information in this embodiment, for example, contains identification code for hot-stamping foil tape 202 (hereinafter, termed tape ID code), flag to differentiate whether hot-stamping foil tape 202 is custom type for specified user or general type where user is not specified or for testing, kind of hot-stamping foil tape 202 (for example, presence of identification mark for determining position, etc.).

Stamping condition information in this embodiment, for example, contains optimal temperature, optimal pressure application, optimal time, appropriate stamping size, corresponding position of identification mark to determine position, etc. at the time of hot-stamping.

Cassette information in this embodiment, for example, contains the serial number of cassette 201, and the number of times this cassette 201 has been recycled up to now, etc.

Control information, as long as information contributes to control of hot-stamping foil tape cassette 201, is not limited to information in above-mentioned examples. These items of control information are, for example, recorded in memory 206 during manufacturing process for cassette 201, to prevent wrongdoing by maliciously intentioned third party, encryption software, for example, provides lock-and-key.

Further, in this embodiment, hot-stamping device 204 contains recording medium 211 that records information (hereinafter, termed device/user information) relating to hot-stamping device 204 and user of hot-stamping device 204. Recording medium 211 in this embodiment, for example, has structure with card-shaped non-contacting tag (RFID) (hereinafter, recording medium is termed ID card 211 in this embodiment). In other words, ID card 211 in this embodiment is No. 2 non-contacting tag capable of communicating with communication function in hot-stamping device 204, having structure with antenna 207 and circuit 208 and transmitter/receiver controller 209 and control section 210. ID card 211 is freely inserted in and withdrawn from hot-stamping device 204, when ID card 211 is inserted, positioning occurs in close proximity of antenna 207.

ID card 211 is provided with communication device 212 that communicates with hot-stamping device 204 without contact, and memory 213 that records and stores device/user information. Communication device 212 has a function identical to communication device 205, previously explained. Memory device 213 is non-volatile memory, for example, and is not limited to rewritable EEPROM and the like, it is possible to select WORM (Write Once/Read Many) type memory depending on use conditions for ID card 211.

As device/user information, in memory 213 in this embodiment, for example, tape ID code for hot-stamping foil tape 202 processible by hot-stamping device 204 is registered as approved ID code, further, user code (user ID) and password are registered to authorize use of hot-stamping device 204. It is possible to set up plurality of tape ID code and user ID and password. Further, user ID and password need not be registered, especially when there are no restrictions on user. Moreover, device/user information recorded in memory 213 need not be limited to these, other necessary information relating to hot-stamping device 204 and user of hot-stamping device 204 can be recorded appropriately. Device/user information recorded in memory 213 seeks to prevent wrongdoing by maliciously intentioned third party, encryption software, for example, provides lock-and-key.

Further, cassette 201 can be attached to or detached from hot-stamping device 4, and although not shown in figure, is provided with a reel on which hot-stamping foil tape 202 is wound, and a windup reel for winding up hot-stamping foil tape 202. Hot-stamping foil in this embodiment, for example, is holographic foil that has vapor-deposited layer such as aluminum and the like. Hot-stamping foil tape 202 is constructed, for example, by supporting holographic foil on carrier film comprising a transparent film. Further, value-added medium comprising a hot-stamping object is a medium having value as protection from wrongdoing such as forgery, or as medium guaranteeing or certifying fixed value by affixing hot-stamping foil; there are no limitations in particular on the kind or form of medium. As such value-added medium, there are, for example, negotiable instruments such as tickets and gift certificates, cards such as credit cards and the like, documents such as certificates, confidential documents, official documents, etc.

Further, in hot-stamping device 204, although not shown in figure, stamping section and windup mechanism for hot-stamping foil tape 202 are provided. Stamping section applies pressure to hot-stamping foil tape 202 and value-added medium to transfer hot-stamping foil to the value-added medium. Tape windup mechanism, for example, drives windup reel after each hot-stamping to wind up used section of hot-stamping foil tape 202, in other words, hot-stamping foil tape 202 for one sheet, unused section of hot-stamping foil tape 202 is sent to face the opposite stamping section.

Next, an example of processing by hot-stamping device 204 having the above structure is explained according to the flow chart shown in FIG. 23 to FIG. 28.

When cassette 201 is set in hot-stamping device 204, non-contacting tag 203 buried in cassette 201 is positioned facing antenna 207. ID card 211 is positioned in close proximity to antenna 207.

When power to hot-stamping device 204 is switched on, control section 210 through antenna 7 reads control information recorded on non-contacting tag 203 (Step 1; Yes). Continuing, it reads device/user information recorded on ID card 211 (Step 2; Yes). Furthermore, when there is no response from non-contacting tag 203 or ID card 211 (Step 1; No or Step 2; No), the alarm process is activated (Step 8). In the alarm process, for example, alarm is sounded and process is ended upon determination that fraudulent cassette 201 or ID card 211 is attached to hot-stamping device 204, or is not attached properly, hot-stamping is not implemented.

Next, control section 210 implements cassette 211 identification process (Step 3). First, from tape ID information, it is decided whether hot-stamping foil tape 202 is custom type or general type (Step 301). When cassette 201 is a custom type (Step 301; Yes), tape ID code recorded on non-contacting tag 203 is checked to see whether it is included in approved ID code registered on ID card 211 (Step 302). If it is not included (Step 302;

No), control section 210 implements alarm process (Step 303). In the alarm process, for example, by audible alarm or message display, the user is informed cassette 201 set therein cannot be used by this hot-stamping device 204, the process is ended, hot-stamping is not implemented. On the other hand, when tape ID code recorded on non-contacting tag 203 is included in approved ID code recorded on ID card 211 (Step 302; Yes), it proceeds to the next process (Step 4). Further, when hot-stamping foil tape 202 is a general type (Step 301; No), it proceeds to the next process (Step 4) without checking tape ID code.

Next, control section 210 implements a process to check approved stamping cycle number (Step 4). When approved stamping cycle number is 0 (Step 401; Yes), control section 210 implements alarm process (Step 402). In an alarm process, for example, by audible alarm or message display, the user is informed that this cassette 201 has already reached approved stamping cycle number, the process is ended, hot-stamping is not implemented. On the other hand, when approved stamping cycle number is not “0” (Step 401; No), it proceeds to the next process (Step 5).

Next, control section 210 implements a process to check whether stamping condition information specified in control information is suitable for hot-stamping device 204 or is in range where adjustment can be made to make it suitable (Step 5). If hot-stamping device 204 is deemed unsuitable (Step 501; No), control section 210 implements alarm process (Step 502). In alarm process, for example, by audible alarm or message display, the user is informed that this cassette 201 is not suitable for this hot-stamping device 204, the process is ended, hot-stamping is not implemented. As example of unsuitability, the stamping size mounted on device 204 may be larger than the stamping size indicated in control information as suitable for hot-stamping foil. On the other hand, when the stamping condition information is deemed suitable for hot-stamping device 204 (Step 501; Yes), it proceeds to the next process (Step 6).

Next, control section 210 implements a process of granting authorization to user of hot-stamping device 204 (Step 6). When the user ID and password are registered on ID card 211 (Step 601; Yes), the user is asked to input user ID and password, key input of user ID and password are received by input device not shown in figure (Step 602). When the user ID is registered on ID card 211, and, moreover, input password corresponds correctly to this user ID (Step 603; Yes), it proceeds to the next process (Step 7). If the user ID, password are illegal (Step 603; No), control section 210 implements the alarm process (Step 604). In the alarm process, for example, the user is given an opportunity to input user ID and password for a set number of times; if there is no correct input, the process is ended, hot-stamping is not implemented. Further, if the user ID and password are not registered on ID card 211 (Step 601; No), without requiring user ID and password, it proceeds to the next process (Step 7).

Next, control section 210 implements hot-stamping process (Step 7). When the presence of value-added medium that is the stamping object at predetermined stamping position is detected (Step 701; Yes), moreover, the user pushes the start button (Step 702; Yes), then control section 210, according to stamping condition information on non-contacting tag, implements stamping at designated optimal temperature, optimal pressure application, and optimal time (Step 703). Then, “1” is subtracted from approved stamping cycle number in memory 206 in non-stamping tag 203, this approved stamping cycle number is refreshed (Step 704).

Then, hot-stamping device 204 winds up hot-stamping foil tape 202 equivalent to one sheet of value-added medium to finish process.

Next, hot-stamping foil tape cassette 201 of this invention and control method for hot-stamping foil tape cassette 201 are explained by one embodiment in which these are utilized.

Figure 21:
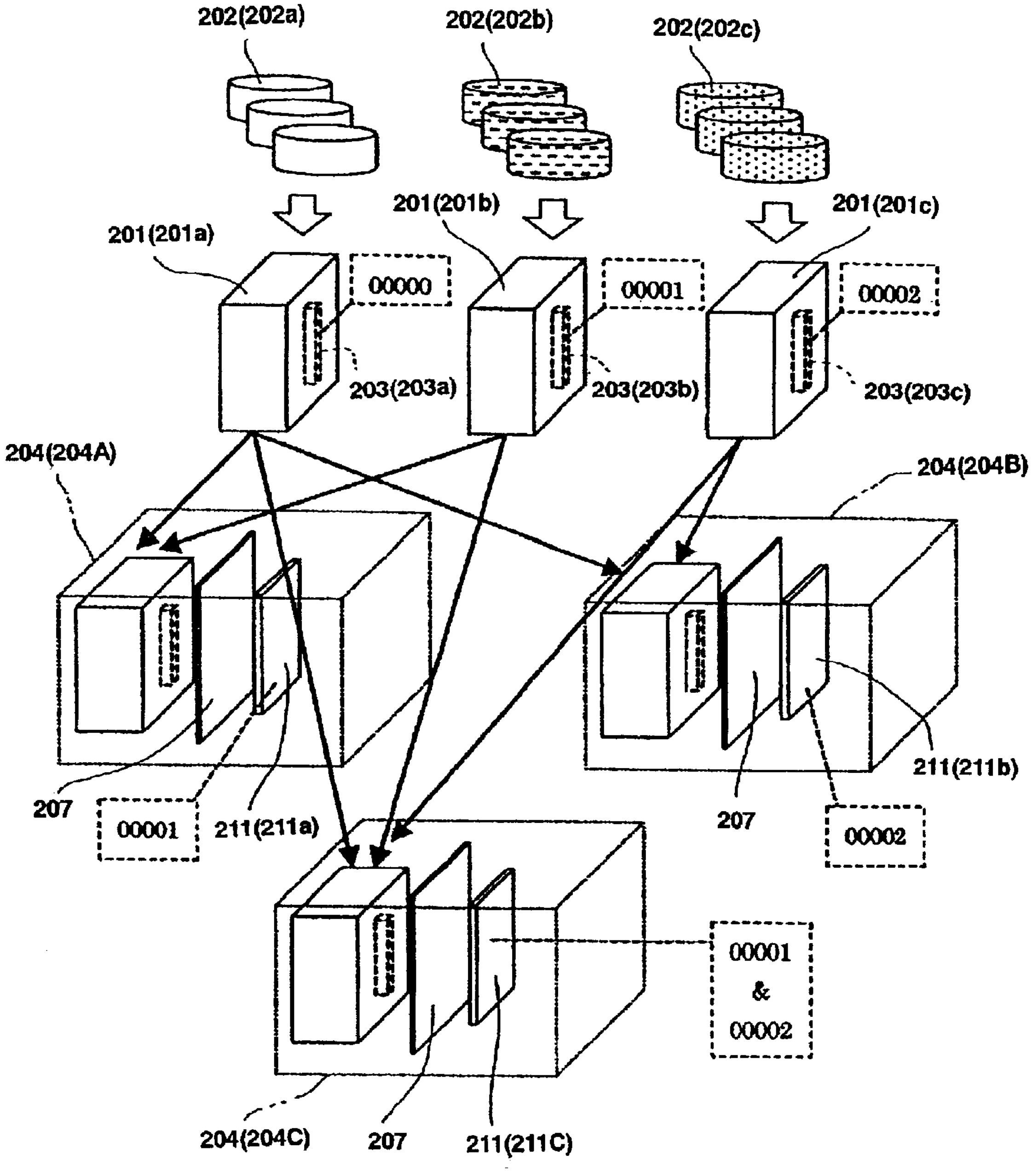
FIG. 21 shows one embodiment utilizing a hot-stamping foil tape cassette and control method for hot-stamping foil tape cassette in this invention, and is an image diagram showing a mode where multiple users use different hot-stamping foil tape.
Figure 22:
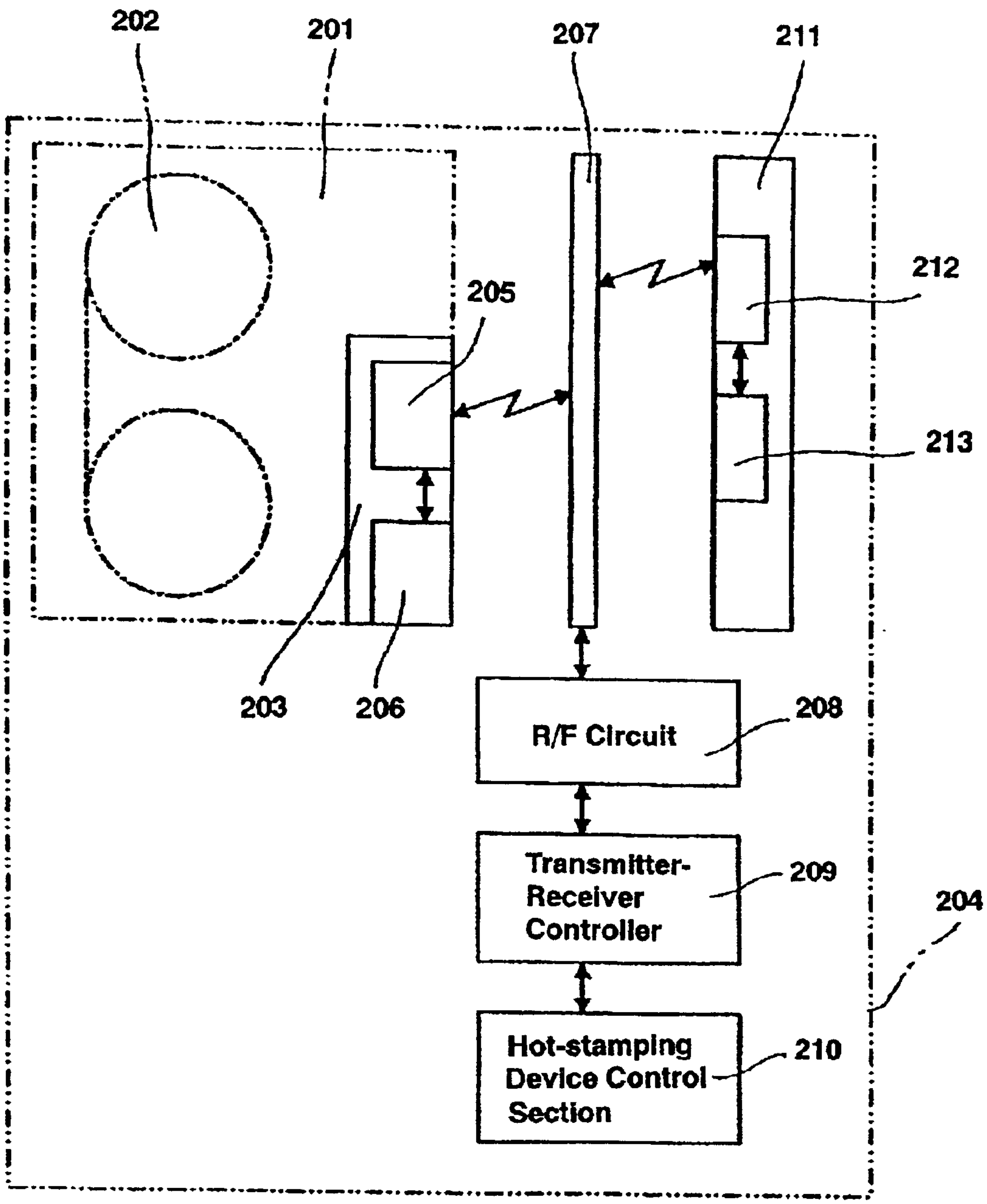
FIG. 22 is a simplified block diagram showing one embodiment of a communication function between the hot-stamping foil tape cassette and a hot-stamping device in this invention.
Figure 23:
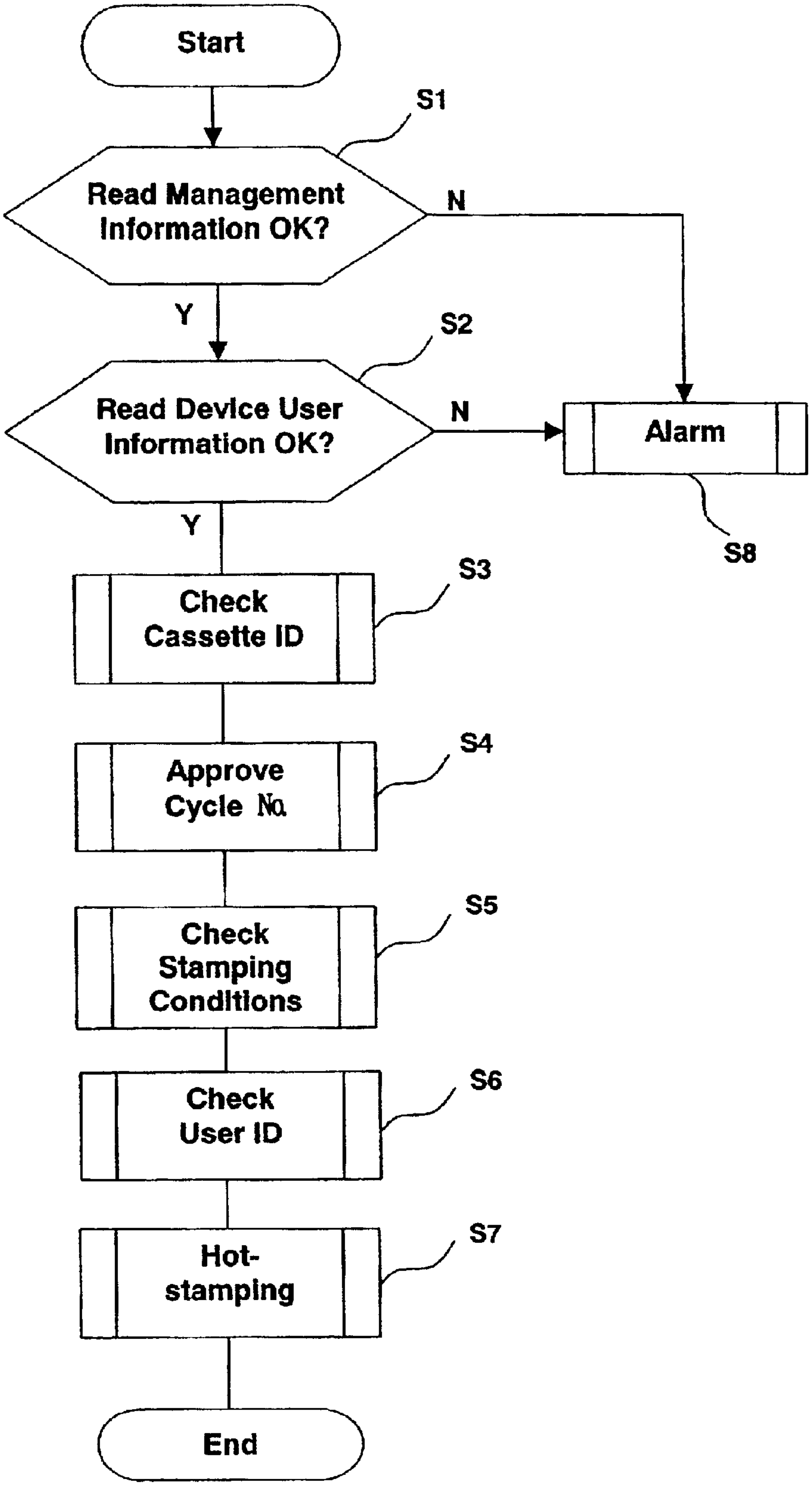
FIG. 23 is a flow chart showing one example of a process in a hot-stamping device utilizing control method for a hot-stamping foil tape cassette in this invention.
Figure 24:
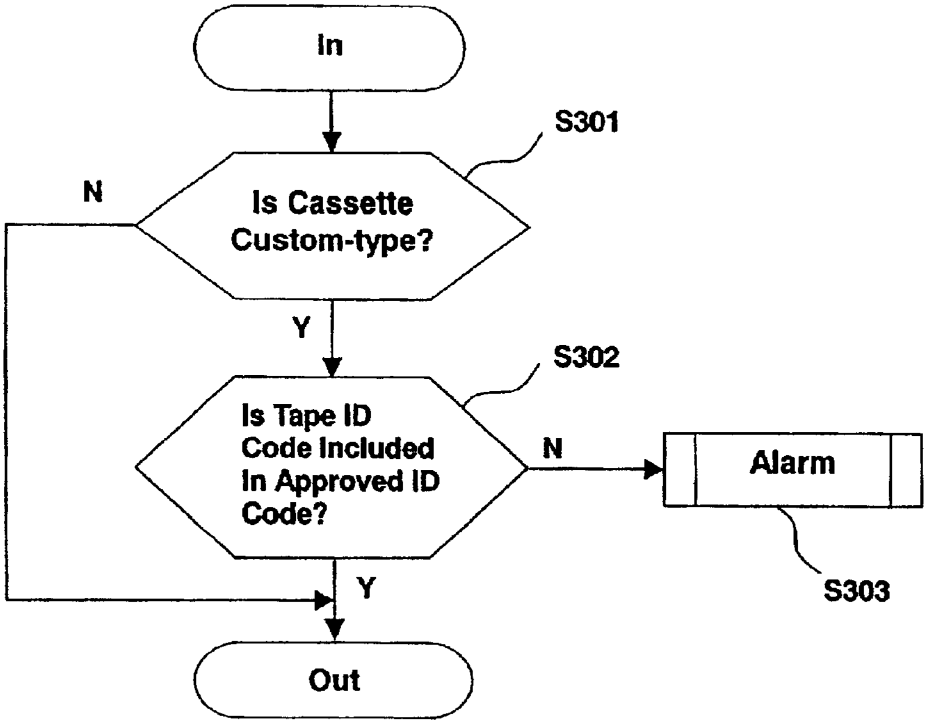
FIG. 24 is a flow chart showing one example of a cassette identification process, and shows one example of a process in a hot-stamping device utilizing a control method for a hot-stamping foil tape cassette in this invention.
Figure 25:
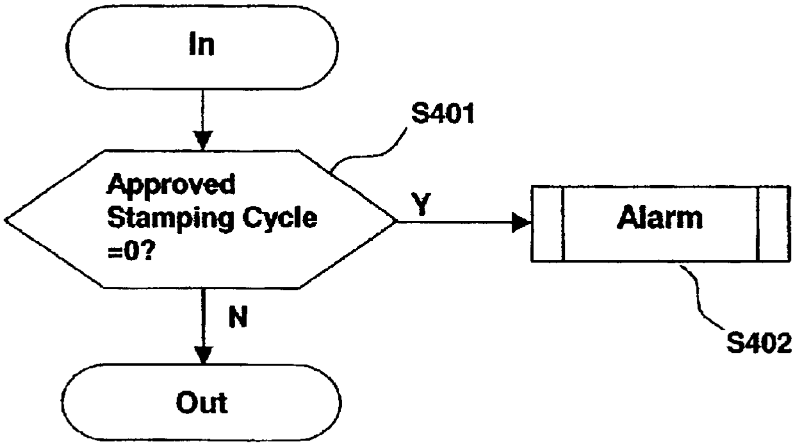
FIG. 25 is a flow chart showing one example of a checking process for an approved stamping cycle number, and shows one example of a process in a hot-stamping device utilizing a control method for a hot-stamping foil tape cassette in this invention
Figure 26:
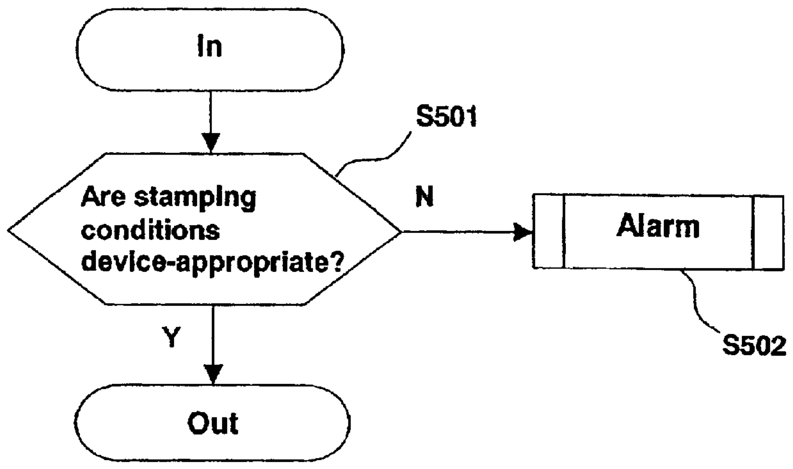
FIG. 26 is a flow chart showing one example of a checking process for stamping conditions, and shows one example of a process in a hot-stamping device utilizing control method for a hot-stamping foil tape cassette in this invention.
Figure 27:
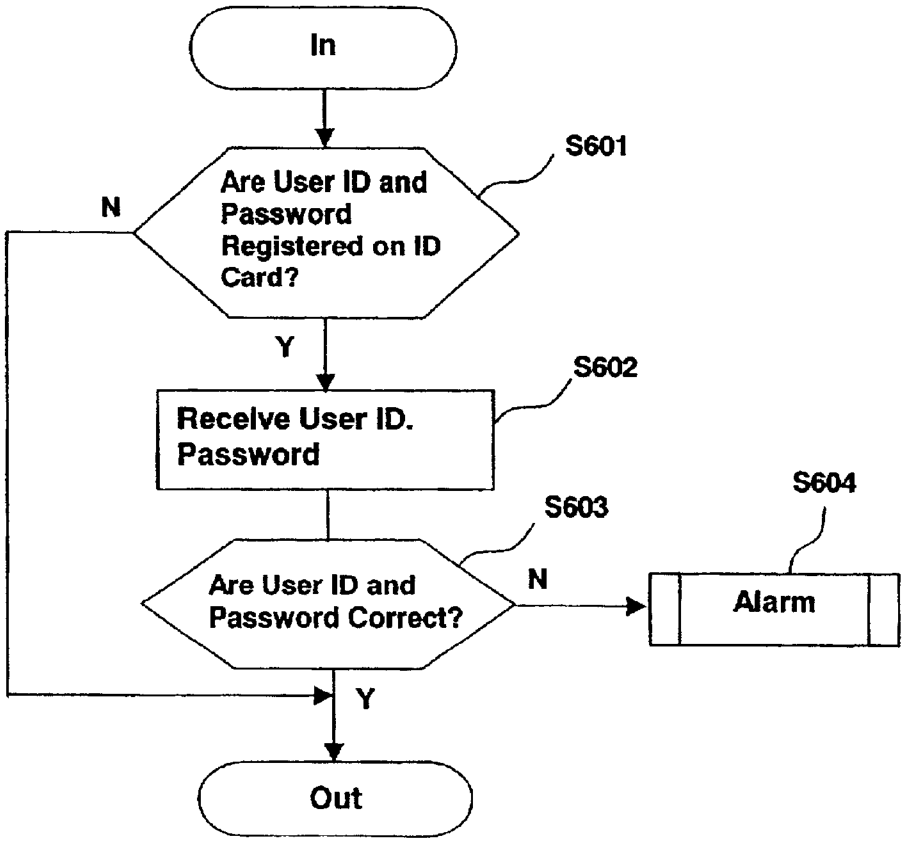
FIG. 27 is a flow chart showing one example of a user identification process, and shows one example of a process in a hot-stamping device utilizing a control method for a hot-stamping foil tape cassette in this invention.
Figure 28:
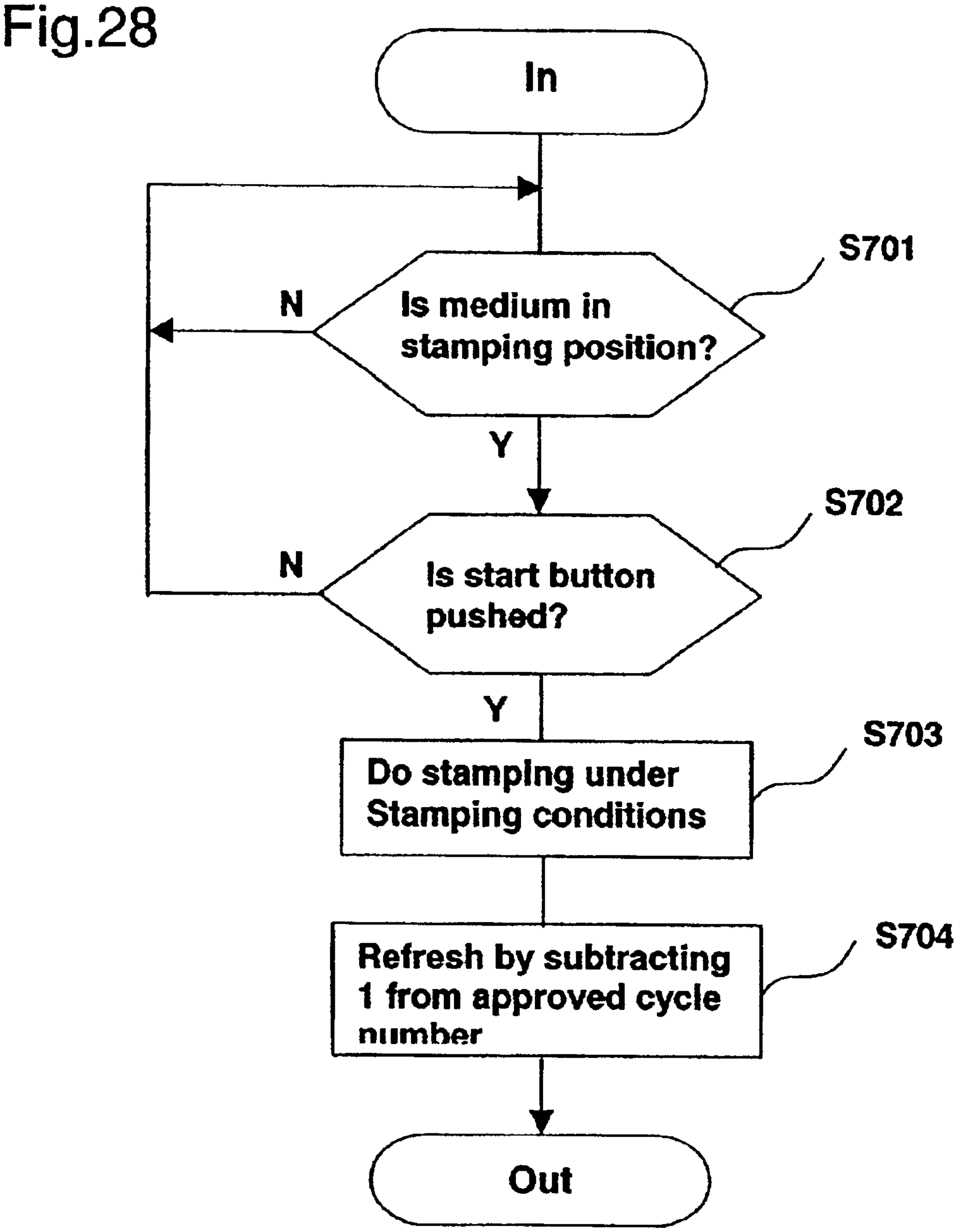
FIG. 28 is a flow chart showing one example of a hot-stamping implementation process, and shows one example of a process in a hot-stamping device utilizing a control method for a hot-stamping foil tape cassette in this invention.

In FIG. 21, hot-stamping foil tape 202*a*, for example, is holographic foil tape in general use. Cassette 201*a* in which hot-stamping foil tape 202 is stored is general-use type cassette. Flag indicating that holographic foil tape 202 is general-use type is recorded on non-contacting tag 203*a* as well, further, tape ID code, for example, “00000” is recorded.

Hot-stamping foil tape 202*b*, for example, comprises holographic foil tape for Customer A and Customer C. Cassette 201*b* that stores hot-stamping foil tape 202*b* is custom-type cassette for use by Customer A and Customer C. In non-contacting tag 203*b*, a flag is recorded that designates holographic foil tape 202 as a custom-type, further, tape ID code, for example, “00001” is recorded.

Hot-stamping foil tape 202*c*, for example, comprises holographic foil tape for Customer B and Customer C. Cassette 201*c* that stores hot-stamping foil tape 202*c* is custom-type cassette for use by Customer B and Customer C. In non-contacting tag 203*c*, a flag is recorded that designates holographic foil tape 202 as a custom-type, further, ID code, for example, “00002” is recorded.

Customer A, Customer B, Customer C, for example, all have hot-stamping device 204 constructed identically, but each has its own ID card 211. In other words, ID card 211*a* for Customer A has approved ID code “00001” registered thereon. ID card 211*b* for Customer B has approved ID code “00002” registered thereon. ID card 211*c* for Customer C has approved ID code “00001” and “00002” registered thereon General-use cassette 201*a* can be utilized in any of hot-stamping device 204 for Customer A, Customer B, Customer C. On the other hand, custom cassette 201*b* can only be utilized in hot-stamping device 204A for Customer A having ID card 211*a* and in hot-stamping device 204C for Customer C having ID card 211*c*. For this reason, in hot-stamping device 204B for Customer B having ID card 211*b*, even if custom cassette 201*b* is attached, hot-stamping cannot be implemented. On the other hand, with custom cassette 201*c*, utilization is possible only in hot-stamping device 204B for Customer B having ID card 211*b* and in hot-stamping device 204C for Customer C having ID card 211*c*. For this reason, hot-stamping cannot be implemented, even when custom cassette 201*c* is attached to hot-stamping device 204A for Customer A having ID card 211*a*.

Further, in hot-stamping device 204 for each of Customer A, Customer B, Customer C, approved stamping cycle number recorded on non-contacting tag 203 is decreased by 1 with each hot-stamping, when approved stamping cycle number reaches 0, hot-stamping cannot be implemented thereafter, even if holographic foil tape 202 remains.

As above, according to hot-stamping foil tape cassette 201 of this invention and control method for hot-stamping foil tape cassette 201, non-contacting tag 203, generally difficult to counterfeit, is provided in cassette 201, therefore, for example, a fraudulent cassette not provided with non-contacting tag 203 cannot be used in hot-stamping device 204. Consequently, fraudulent cassette usage can be eliminated.

Furthermore, even when cassette 201 has non-contacting tag 203, hot-stamping cannot be implemented when tape ID code recorded on non-contacting tag 203 is not included in approved ID code recorded on ID card 211; therefore, inappropriate use of cassette 201 can be eliminated. Further, custom-use hot-stamping foil tape 202 for a specific customer can be utilized only by this specific customer, therefore, security of custom-use hot-stamping foil can be enhanced.

Furthermore, when the approved stamping cycle number recorded on non-contacting tag 203 becomes "0", even if there is excess hot-stamping foil tape left, this cassette 201 cannot be used. Consequently, an appropriate royalty can be recovered according to sheet count of value-added medium on which hot-stamping foil is attached. For example, control is possible even when sheet count of value-added medium is 5500 initially for hot-stamping foil tape 202, cassette 201 can be sold as having approved sheet count of 5000; royalty for 5000 sheets is received, unusable cassette 201 is recovered after 5000 sheets are used. Further, for example, even in the situation where sheet count of stampable value-added medium varies to the end in one cassette, because holographic foil tape has a continuous design that has no identification mark to determine positioning, and tape windup spacing varies, stamping number per cassette can be continuously constant; unfairness and inequality can be prevented.

Further, when the approved stamping cycle number recorded on non-contacting tag 203 becomes "0", this cassette 201 cannot be used, therefore, for example, wrongdoing such as inserting counterfeit holographic foil tape in cassette 201 can be prevented.

Moreover, the remainder of hot-stamping foil tape 202 can be managed accurately from an approved stamping cycle number recorded on non-contacting tag 203, therefore, for example, there is no need to provide separately for means of detecting remainder of hot-stamping foil tape 202. Further, there is also no need to use hot-stamping foil tape 202 to the very end; therefore, for example, there is no need to provide means for tape end detection to prevent excess load on the tape windup mechanism. Consequently, the structure of hot-stamping device 204 also can be simplified.

Furthermore, non-contacting tag 203 has recorded thereon, for example, a kind of hot-stamping foil tape and whether it has an identification mark for determining position, and stamping condition information for implementing optimal stamping according to this kind and directions from the tape manufacturer; control section 210 in device 204 implements optimal control on the basis of stamping condition information, so stamping is possible continually under optimal conditions, without need for the user to perform a setup. Consequently, hot-stamping can be realized in a very simple and, moreover, satisfactory fashion. Further, stamping misses are prevented by not implementing hot-stamping when designated stamping conditions are not met.

Furthermore, user ID and password are registered on ID card 211 to grant authorization to user of device 204, so fraudulent hot-stamping by unauthorized person is prevented.

Moreover, when ID card 211 is moved to another hot-stamping device 204, it is not necessary to repeat a setup of device/user information to use this device 204 under identical conditions; exchange operations can be done very easily in case of trouble with hot-stamping device 204. Further, important data such as user ID and password do not follow device 204 that is being repaired, so user security is maintained.

Further, ID card 211 and non-contacting tag 203 communicate with hot-stamping device 204 through the same antenna 207; it is possible to plan cost reduction by sharing parts.

Furthermore, the embodiment described above is one example of very suitable working examples of this invention, but there are no restrictions thereby, various different modes of embodiment are possible as long as these are within the range of the gist of this invention.

Figure 29:
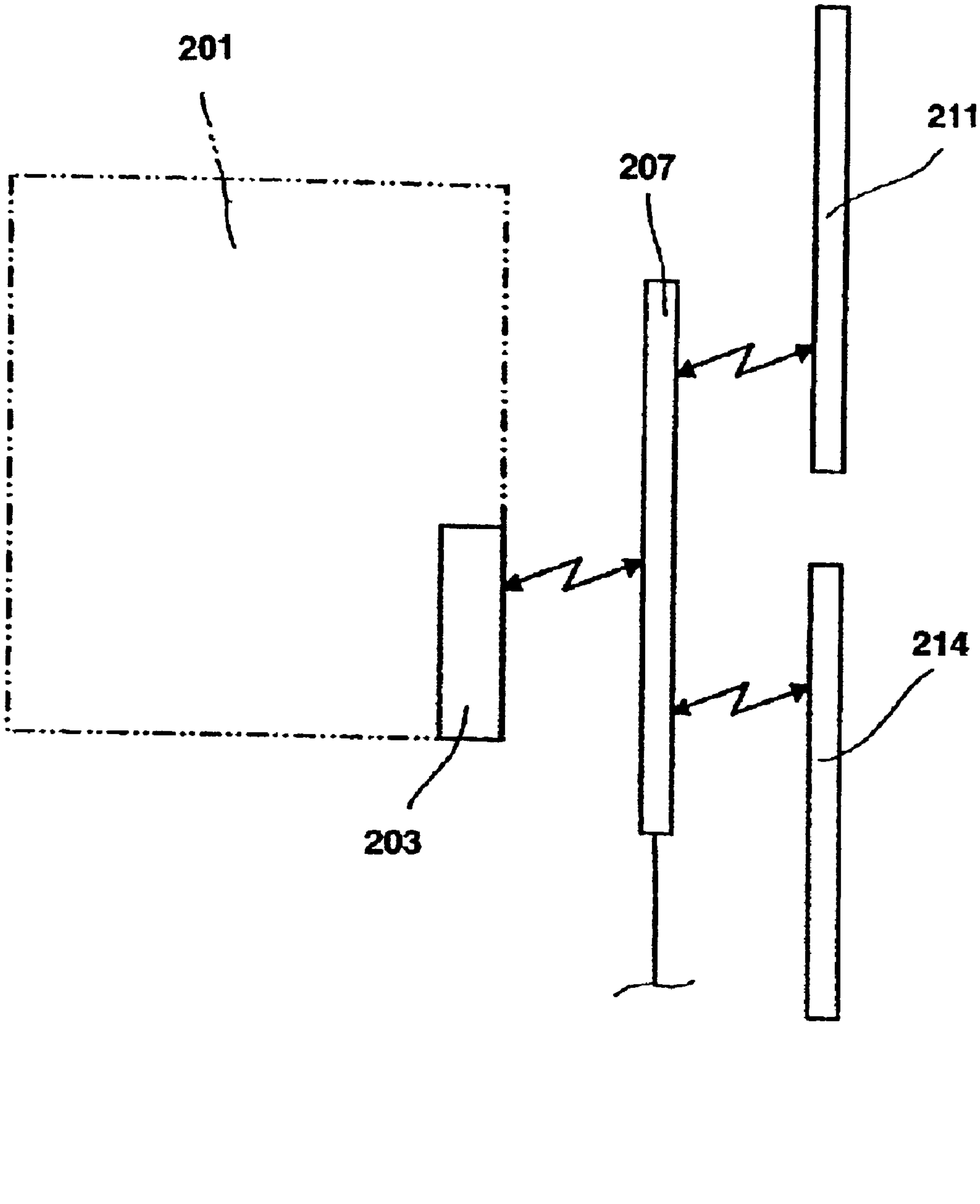
FIG. 29 is a simplified structural diagram showing another embodiment utilizing a control method for a hot-stamping foil tape cassette in this invention.

For example, for user authorization, there is no need to restrict only to key input by user of user ID and password. For example, user authorization card 214 (for example, employee ID) that users have individually, can be constructed in RFID, user ID and password can be recorded on user authorization card 214. Then, as shown in FIG. 29, at the time of user authorization, user authorization card 214 together with ID card 211 is positioned in close proximity to antenna 207; through antenna 207, control section 210 of hot-stamping device 204 and user authorization card 214 establish communication to check whether user ID and password recorded on user authorization card 214 is registered on ID card 211, authorization to this user can be granted in this way.

Further, instead of non-contacting tag 203 described above, it is possible, for example, to utilize contacting tag provided with an IC contact point, further, instead of ID card 211 constructed using RFID, to utilize, for example, contacting IC card provided with an IC contact point. However, in this case, instead of sharable antenna 7, it is necessary to provide hot-stamping device 204 with 2 IC contact point blocks to establish communication with contacting tag and IC card.

Further, for example, recording medium 211 that records and stores device/user information is not restricted to being constructed as a card-shape RFID, for example, it can be a recording medium that is provided on hot-stamping device 204, such as a non-volatile memory and the like, that is read-writable by control section 210.

Further, as application of this invention, for example, it is possible to mount a non-contacting tag that can communicate with hot-stamping device 204 on part connected with hot-stamping device 204. For example, it is possible to mount non-contacting tag on the stamping section itself, so the stamping area and size information can be transferred reliably to the body of hot-stamping device 204.

It is clear from the above explanation that hot-stamping foil tape cassette described has a shutter that except at the time of hot-stamping transfer, protects hot-stamping foil tape, after hot-stamping; by means of the shutter, hot-stamping foil tape is peeled from the value-added medium, therefore, hot-stamping foil tape is protected by the shutter from physical damage such as dirt, heat, cuts and scratches, etc., continually satisfactory hot-stamping can be provided. Furthermore, at the time of hot-stamping when the shutter is opened and after hot-stamping when the shutter is closed again, the shutter can be inserted between the hot-stamping foil tape and the value-added medium to peel the hot-stamping foil tape from the value-added medium. Further, because the holographic foil is attached as a cassette-type, exchange of cassette can be implemented easily when there is changeover to a different hot-stamping foil tape; exchange operations are very easy in comparison to conventional open reel structure.

Further, in peeling mechanism for hot-stamping device described at the time of hot-stamping, the shutter in the hot-stamping foil tape cassette is opened, on the other hand, after hot-stamping, as hot-stamping foil tape cassette is being withdrawn from the value-added medium, the shutter is closed simultaneously to peel the hot-stamping foil tape from the value-added medium; when the shutter is being closed, the shutter is inserted between hot-stamping foil tape and value-added medium, as hot-stamping foil tape is being pulled up from value-added medium, hot-stamping foil tape can be peeled from value-added medium consistently and, moreover, in satisfactory fashion. In this situation, there is no need to move value-added medium when hot-stamping foil tape is peeled from value-added medium, even when a document such as a brochure is hot-stamping object, damage to this document can be avoided. Furthermore, by linking the cassette movement mechanism that regardless of thickness of value-added medium enables cassette to come in contact with value-added medium at the time of hot-stamping, and opening/closing of shutter, it is possible to implement peeling of hot-stamping foil tape in a satisfactory fashion, continually, with identical optimal timing regardless of the kind of value-added medium, from single sheet to brochure.

Further, in the foil-peeling mechanism in the hot-stamping device described above, the cassette movement mechanism has a connection connecting to the shutter, the shutter is opened and closed by action of the cassette movement mechanism; consequently, without the need to provide an actuator for use in opening/closing separately as the hot-stamping foil tape is pulled up from the value-added medium, the shutter is inserted between the hot-stamping foil tape and the value-added medium, thus cassette withdrawal from the value-added medium and the shutter closing can be linked with optimal timing.

Further, in a peeling method for hot-stamping foil described above, a hot-stamping foil tape cassette is used; at the time of hot-stamping, hot-stamping foil tape cassette is made to come in contact with the value-added medium and, moreover, the shutter in hot-stamping foil tape cassette is opened; after hot-stamping, as hot-stamping foil tape cassette is being withdrawn from value-added medium, the shutter is closed to peel hot-stamping foil tape from value-added medium; as hot-stamping foil tape is pulled up from value-added medium, shutter is inserted between hot-stamping foil tape and value-added medium, hot-stamping foil tape can be peeled reliably and, moreover, in a satisfactory fashion without damage to the value-added medium.

Non-contacting tag that records control information is provided in hot-stamping foil tape cassette described above, therefore, by confirming the presence of non-contacting tag and its validity, use of fraudulent hot-stamping foil tape cassette that does not have non-contacting tag or has unqualified non-contacting tag can be eliminated. Further, useful control information can be recorded on non-contacting tag, by utilizing this control information, control of sheet count of hot-stamping foil and control of setup of optimal stamping conditions corresponding to hot-stamping foil, etc. can be performed simply and, moreover, appropriately, without depending on human input.

Further, in the control method for hot-stamping foil tape cassette described above, a non-contacting tag that records control information is provided in the hot-stamping foil tape cassette; the hot-stamping device is provided with communication function for communicating with the non-contacting tag so the hot-stamping device can identify hot-stamping foil tape cassette on the basis of control information; when the hot-stamping device communicates with the non-contacting tag, presence and validity of the non-contacting tag is confirmed, use of hot-stamping device by fraudulent hot-stamping foil tape cassette that does not have non-contacting tag or has unqualified non-contacting tag can be prevented. Further, the hot-stamping device can identify the hot-stamping foil tape cassette on the basis of control information recorded on the non-contacting tag, and can implement precise processing, according to the kind and status of this cassette. By this means, control of the hot-stamping foil tape cassette can be performed appropriately.

Further, in control method for hot-stamping foil tape cassette described above, control information includes approved stamping cycle number, refreshed by subtracting "1" each time hot-stamping is implemented, when approved stamping cycle number is "0", hot-stamping device does not implement hot-stamping; therefore, when the approved stamping cycle number becomes "0", stamping is not implemented when predetermined number of stamping cycle is exceeded, even if excess hot-stamping foil tape remains, precise control of sheet usage count of hot-stamping foil is implemented. Consequently, appropriate royalty can be recovered according to the sheet usage count of value-added medium on which hot-stamping foil is affixed. Further, stamping count per cassette can be set with consistency, unfairness and inequity can be prevented.

Further, when the approved stamping cycle number recorded on non-contacting tag becomes "0", such cassette can no longer be used; for example, wrongdoing such as the refilling cassette with counterfeit holographic foil tape can be prevented.

Further, because remaining amount of hot-stamping foil tape can be managed accurately from approved stamping cycle number recorded on non-contacting tag, it is not necessary to provide separate means to determine remaining amount of hot-stamping foil tape. Further, there is no need to use hot-stamping foil tape to its very end, so for example, it also becomes unnecessary to provide means to detect tape end to prevent excess load on tape windup mechanism. Consequently, construction of hot-stamping device can be simplified.

Further, in the control method for hot-stamping foil tape cassette described above, control information includes stamping condition information, hot-stamping device implements hot-stamping according to the stamping condition information. Consequently, the hot-stamping device automatically provides optimal control on the basis of stamping condition information, such as the kind of hot-stamping foil tape in use, so there is no need for the user to do reset. Hot-stamping can be realized very simply and, moreover, in a satisfactory fashion. Further, when the specified stamping condition is not met, hot-stamping is not implemented, so stamping misses can be prevented.

Further, in a control method for hot-stamping foil tape cassette described above, control information includes a tape ID code; a hot-stamping device has recording medium for registering tape ID code of processible hot-stamping foil tape as the approved ID code, and additionally, does not implement hot-stamping when tape ID code is not included in an approved ID code. Therefore, customized hot-stamping foil tape for special customer can be used only by special customer to whom this hot-stamping foil tape ID code is registered, therefore, security of customized hot-stamping foil can be increased.

Further, in a control method for hot-stamping foil tape cassette described above, the user code and password are registered in recording medium, hot stamping can be implemented after user code and password are confirmed. Consequently, fraudulent hot-stamping by a non-authorized person can be prevented.

Further, in the control method for hot-stamping foil tape cassette described above, the recording medium comprises second non-contacting tag that is able to communicate with communication function of hot-stamping device; therefore, if a second non-contacting tag is moved to another hot-stamping device, this device can be utilized under identical conditions without repeating the setup. Consequently, exchange operations can be performed easily when problems occur with the hot-stamping device. Further, the communication function of the hot-stamping device is shared with the non-contacting tag provided on the hot-stamping foil tape cassette and the second non-contacting tag. Consequently, cost reduction from sharing of parts is part of the inventive plan.

While the foregoing description and drawings represent the present invention, it will be obvious to those skilled in the art that various changes may be made therein without departing from the true spirit and scope of the present invention.

What is claimed is:

1. A hot-stamping foil tape cassette, comprising:

a hot-stamping foil tape transferred by pressure application together with a value-added medium to said value-added medium;

a windup reel for winding up said hot-stamping foil tape;

a source reel on which said hot-stamping foil tape is wound, said windup and source reels being stored in a cassette case; and a shutter;

said shutter, except at a time of hot-stamping transfer, being in a protective position that protects said hot-stamping foil tape;

said shutter at the time of hot-stamping transfer withdrawing to a withdrawal position that does not interfere with action of said hot-stamping transfer;

wherein, after hot-stamping, by said shutter, said hot-stamping foil tape can be peeled from said value-added medium.

2. A foil-peeling mechanism for a hot-stamping device, being provided with a hot-stamping foil tape cassette according to claim 1, and a cassette movement mechanism that makes said hot-stamping foil tape cassette come in contact with the value-added medium at the time of hot-stamping and together with this, after hot-stamping, withdrawing said hot-stamping foil tape cassette from said value-added medium, wherein at the time of hot-stamping, said shutter in said hot-stamping foil tape cassette opens, and on the other hand, after hot-stamping, said shutter is closed in conjunction with withdrawal of said hot-stamping foil tape cassette from said value-added medium to peel hot-stamping foil tape from said value-added medium.

3. A foil-peeling mechanism in a hot-stamping device according to claim 2, wherein said cassette movement mechanism has a connection for connecting to said shutter, said shutter being opened and closed by action of said cassette movement mechanism.

4. A hot-stamping foil peeling method using a hot-stamping foil tape cassette according to claim 1, comprising the steps of:

making said hot-stamping foil tape cassette come in contact with the value-added medium at the time of hot-stamping;

opening the shutter in said hot-stamping foil tape cassette, at the time of hot-stamping; and while withdrawing the hot-stamping foil tape cassette from said value-added medium, closing the shutter to peel the hot-stamping foil tape from said value-added medium.

5. The hot-stamping foil tape cassette according to claim 1, wherein said cassette is provided with a non-contacting tag that records control information.

6. A hot-stamping foil cassette, comprising:

a hot-stamping foil;

a carrier film carrying the hot-stamping foil to be pressure transferred to a value-added medium;

a windup reel for winding up the carrier film;

a source reel on which the carrier film is wound, the windup and source reels being stored in a cassette case, and a shutter operable to be in a protective position that protects the hot-stamping foil being carried by the carrier film and to be in a withdrawal position that does not interfere with an action of hot-stamping;

wherein, after hot-stamping, the shutter is operable to peel the pressure transferred hot-stamping foil from the carrier film.

7. The hot-stamping foil cassette according to claim 6, further comprising a cassette movement mechanism operable to make the cassette case come in contact with the value-added medium at the time of hot-stamping and after hot-stamping, withdraw the cassette case from the value-added medium, wherein at the time of hot-stamping, the shutter opens, and after hot-stamping, the shutter is closed in conjunction with withdrawal of the cassette case from the value-added medium to peel the hot-stamping foil from the carrier film.

8. The hot-stamping foil cassette according to claim 7, wherein the cassette movement mechanism has a connection for connecting to the shutter, the shutter being opened and closed by action of the cassette movement mechanism.

9. The hot-stamping foil tape cassette according to claim 6, wherein:

at the time of hot-stamping, the shutter is opened and the cassette case comas in contact with the value-added medium;

after the hot-stamping, the cassette case is withdrawn from the value-added medium while the shutter closes to peel the carrier film from the hot-stamping foil on the value-added medium.

* * * * *